United States Patent
Bérubé

(10) Patent No.: US 11,400,419 B2
(45) Date of Patent: Aug. 2, 2022

(54) METHOD AND APPARATUS FOR PASSIVELY BUBBLING GAS THROUGH LIQUID

(71) Applicant: The University of British Columbia, Vancouver (CA)

(72) Inventor: Pierre Bérubé, Vancouver (CA)

(73) Assignee: The University of British Columbia, Vancouver (CA)

( * ) Notice: Subject to any disclaimer, the term of this patent is extended or adjusted under 35 U.S.C. 154(b) by 186 days.

(21) Appl. No.: 16/959,984

(22) PCT Filed: Dec. 24, 2018

(86) PCT No.: PCT/CA2018/051670
§ 371 (c)(1),
(2) Date: Jul. 2, 2020

(87) PCT Pub. No.: WO2019/134035
PCT Pub. Date: Jul. 11, 2019

(65) Prior Publication Data
US 2021/0060495 A1    Mar. 4, 2021

Related U.S. Application Data
(60) Provisional application No. 62/612,859, filed on Jan. 2, 2018.

(51) Int. Cl.
*B01D 65/02*    (2006.01)
(52) U.S. Cl.
CPC .......... *B01D 65/02* (2013.01); *B01D 2315/06* (2013.01); *B01D 2321/04* (2013.01); *B01D 2321/185* (2013.01)

(58) Field of Classification Search
CPC ........ B01D 29/62; B01D 29/66; B01D 35/16; B01D 61/14; B01D 61/18; B01D 61/22;
(Continued)

(56) References Cited

U.S. PATENT DOCUMENTS 4,211,733 A * 7/1980 Chang ................... B01F 23/454
261/36.1
5,332,534 A    7/1994 Ebner
(Continued)

FOREIGN PATENT DOCUMENTS

AU    2008263139 B2    12/2008

OTHER PUBLICATIONS

Oka, P.A. et al., "Operation of passive membrane systems for drinking water treatment", Water Research 115 (2017) 287-296.
(Continued)

*Primary Examiner* — Patrick Orme
(74) *Attorney, Agent, or Firm* — Oyen Wiggs Green & Mutala LLP

(57) ABSTRACT

Methods and apparatuses for adding gas bubbles to a tank containing liquid at locations that allow the bubbles to rise to the top of the tank are disclosed. One embodiment comprises a membrane filtration system connected to a gas source and a drain. The membrane filtration system draws gas into the system from the gas in response to a reduced pressure profile created by opening a drain. The gas may be air supplied at atmospheric pressure.

20 Claims, 15 Drawing Sheets

(58) Field of Classification Search
CPC .... B01D 65/02; B01D 65/08; B01D 2313/50; B01D 2315/06; B01D 2321/04; B01D 2321/185; B01F 33/403; B01F 33/405; B01F 33/406; B01F 33/409; B01F 35/71; B01F 35/718; B01F 35/71801; C02F 1/44; Y02W 10/37
See application file for complete search history.

(56) References Cited

U.S. PATENT DOCUMENTS

| | | |
|---|---|---|
| 6,524,481 B2 | 2/2003 | Zha et al. |
| 8,372,282 B2 | 2/2013 | Zha et al. |
| 8,758,622 B2 | 6/2014 | Muller |
| 2005/0056431 A1* | 3/2005 | Harrington ............. C02F 3/223 |
| | | 166/372 |
| 2006/0201876 A1 | 9/2006 | Jordan |

OTHER PUBLICATIONS

"ZeeWeed pressurized ultrafiltration", Suez Water Technologies & Solutions fact sheet, Nov. 2018.
HYDRACAP Max 40 spec sheet, Nitto Group Company, Dec. 2018.
Piping and Instrumentation Diagram, Port Alberni (Hupacasath First Nation), Dec. 2018.
Cui, Z.F. et al., "The Use of Gas Bubbling to Enhance Membrane Processes", Journal of Membrane Science, 221, pp. 1-35, Aug. 15, 2003.
Bohm, L. et al., "The importance of fluid dynamics for MBR fouling mitigation"l, Bioresource Technology, 122:50-61, Oct. 2012.

* cited by examiner

METHOD AND APPARATUS FOR PASSIVELY BUBBLING GAS THROUGH LIQUID

CROSS-REFERENCE TO RELATED APPLICATIONS

This application claims priority from U.S. Application No. 62/612,859 filed 2 Jan. 2018. For purposes of the United States, this application claims the benefit under 35 U.S.C. § 119 of U.S. Application No. 62/612,859 filed 2 Jan. 2018 and entitled METHOD AND APPARATUS FOR PASSIVELY BUBBLING GAS THROUGH LIQUID which is hereby incorporated herein by reference for all purposes.

FIELD

This invention relates to methods and apparatuses for introducing gas bubbles into a tank containing liquid at locations that allow the bubbles to rise through the tank. The invention has example applications in water purification and membrane filtration processes.

BACKGROUND

Introducing bubbles into liquid contained in a tank may be desirable for promoting mixing and scouring in various physical, chemical and biological processes. One example process is the air scouring of membrane filtration systems. In air scouring processes air bubbles are periodically added to a tank containing a membrane submerged in a liquid. Rising air bubbles agitate the liquid and thereby clean the surface of the submerged membrane. It is usual to pressurize the air using mechanical devices such as air blowers or gas pumps in order to generate the pressure differential required to convey air from the atmosphere to one or more locations where the air is released into the tank.

The following references describe the air scouring of membrane filtration systems:

Bohm L., Drews A., Prieske H., Berube P. R. and Kraume M. (2012) The importance of fluid dynamics for MBR fouling control, Bioresource Technology, 122:50-61.

Cui Z. F., Chang S. and Fane A. G. (2003) The use of gas bubbling to enhance membrane processes, Journal of Membrane Science, 221: 1-35.

In some situations, it can be difficult, expensive or even impossible to use mechanical devices (e.g. blowers, gas pumps, etc.). For example, electrical power may not be available or only available intermittently in remote settings and small communities. In situations like these, additional equipment (e.g. power generator, power source, etc.) is required to operate the air blowers, the gas pumps and/or the membrane filtration system. This can introduce additional costs and complexity. Overly complex membrane filtration systems can be problematic in situations where personnel with the technical skills required for maintaining and repairing complicated membrane filtration systems are not available.

Despite the current depth of knowledge in the field of the air scouring of membrane filtration systems, there remains a need for new practical and cost efficient methods and apparatuses for introducing gas bubbles into tanks containing liquid. There is a particular need for such methods and apparatuses which are applicable for use in remote locations.

SUMMARY

Various examples and alternative embodiments are described herein. These embodiments and examples are illustrative and should not be construed as limiting the scope of the invention.

One aspect of the invention provides a method for introducing air bubbles to a tank containing liquid without the need for devices such as air blowers or gas pumps. The method comprises introducing air bubbles to the tank containing liquid using a partial vacuum. The partial vacuum is created by draining liquid from the tank. The partial vacuum can draw in fluids such as bubbles as air and/or other gases into the tank from a gas supply location. The gas may be supplied at atmospheric pressure.

One aspect of the invention provides a method for introducing gas into a liquid by reducing the pressure of the liquid within a tank by placing the liquid within the tank in fluid communication with a fluid outlet such that the reduced pressure of the liquid at a gas supply location above the fluid outlet is lower than a gas supply's pressure. The gas provided by the gas supply enters the liquid as a result of the difference between the reduced pressure of the liquid and the gas supply's pressure. The gas rises from the gas supply location through the tank. The liquid displaced by the gas exits the tank by way of the fluid outlet.

In some embodiments, the gas supply is ambient air. The gas supply pressure may be ambient atmospheric pressure. In some embodiments, supplying the gas at the supply location comprises opening a gas valve while placing the liquid within the tank in fluid communication with the fluid outlet. In some embodiments, supplying the gas at the supply location comprises opening a drain valve that is below the gas supply location. The gas supply valve may optionally be opened after the drain valve has been opened.

In some embodiments, supplying the gas at the supply location comprises draining any of the liquid out of an open gas supply conduit that is open to the atmosphere at a location above the gas supply location. In some embodiments, the fluid outlet connects to the tank by way of a drain line and the gas supply location is in the drain line. The gas supplied by the gas supply may enter the tank by way of the drain line. The gas supply location may optionally comprise a port in a lower part of the tank.

In some embodiments, a filter is located in the tank and the method comprises allowing the gas to scour the filter as the gas rises through the tank. The reduced pressure may also draw liquid back through the filter to backwash the filter. Foulants scoured from the filter may drain by way of the fluid outlet.

In some embodiments, the tank is subsequently refilled with the liquid and a pressure differential is applied to cause the liquid to pass through the filter. Gas may be vented from the tank during this refill process. After the refill process and prior to reducing the pressure in the tank, the pressure of the liquid at the gas supply location may be greater than the gas supply pressure. In some embodiments, the method excludes compressing the gas that is supplied at the gas supply location using a pump, compressor or blower. The liquid may comprise water in some embodiments.

Another aspect of the invention provides an apparatus for introducing gas into a liquid, the gas comprising: a closed tank, a fluid outlet located below the tank, a drain valve connected between the tank and the fluid outlet and operative to place an interior of the tank in fluid communication with the fluid outlet, and a gas source in fluid communication with the interior of the tank and arranged to supply a gas at a gas supply location at an elevation above the fluid outlet.

In some embodiments, the apparatus is operative to supply the gas at atmospheric pressure. The gas source may comprise a source of air. In some embodiments, the gas supply comprises an open gas supply conduit that is open to the atmosphere at a location above the gas supply location. The gas supply conduit may optionally be open to the atmosphere at a location that is above a top of the tank. In some embodiments, the apparatus comprises a gas supply valve connected between the gas source and the gas supply location.

In some embodiments, the apparatus comprises a controller connected to control the drain valve, wherein the controller is configured to periodically open the drain valve to create a partial vacuum at the gas supply location. The partial vacuum draws the gas from the gas source into the tank. In some embodiments, the apparatus comprises a filter in the tank located in a path taken by the gas in rising through the tank such that the rising gas scours the filter.

A further aspect of the invention provides a membrane filtration system comprising a tank comprising: at least one fluid port, a membrane filter in the tank connected to a permeate line that exits the tank, a drain line in fluid connection with an interior of the tank by way of the at least one fluid port, a drain valve operative to open or close the drain line, a liquid supply valve in fluid communication with the interior of the tank and a liquid supply connected to supply liquid to the interior of the tank by way of the liquid supply valve and the at least one fluid port, a gas source connected to supply gas at a gas supply location in fluid communication with the interior of the tank wherein the gas supply is located at an elevation below the filter and above an outlet of the drain line (in some embodiments the gas supply location is above the drain valve), and a controller connected to control the drain valve and the liquid supply valve and configured to close the liquid supply valve and open the drain valve and to thereby create a partial vacuum at the gas supply location to draw a gas from the gas source into the tank.

In some embodiments, the liquid supply comprises a raw water tank. The gas vent may optionally comprise a check valve in a top part of the tank. The gas supply location may be optionally located in the drain line.

In some embodiments, the controller is configured to switch the system from a permeation configuration in which the drain valve is closed and the liquid supply valve is open to a cleaning configuration in which the liquid supply valve is closed and the drain valve is open. The controller may be optionally configured to periodically switch the system from the permeation configuration to the cleaning configuration.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Introduction of Bubbles into Tank

The present technology exploits a pressure reduction that occurs when a closed tank is drained to draw air or another gas into the tank at a location from which the gas can form bubbles that rise through the tank. In some embodiments the tank comprises a filter (e.g. a membrane filter), the bubbles are introduced at a location below the filter and the bubbles rise past a surface of the filter so as to aid in dislodging contaminants from the surface of the filter.

The present technology can be embodied in methods which include causing a pressure of liquid at a gas inlet port to a tank to be reduced by commencing draining of the tank, wherein the reduced pressure facilitates entry of air or another gas into the tank by way of the port. The present technology may also be embodied in an apparatus which includes a tank having a gas entry port and a drain valve controlling flow to a drain outlet wherein the gas entry port is at an elevation above the drain outlet. In some embodiments, the gas entry port is at an elevation above the drain valve. A control system may be supplied to control the drain valve to cause pressure reductions at the gas entry port.

Figure 1A:
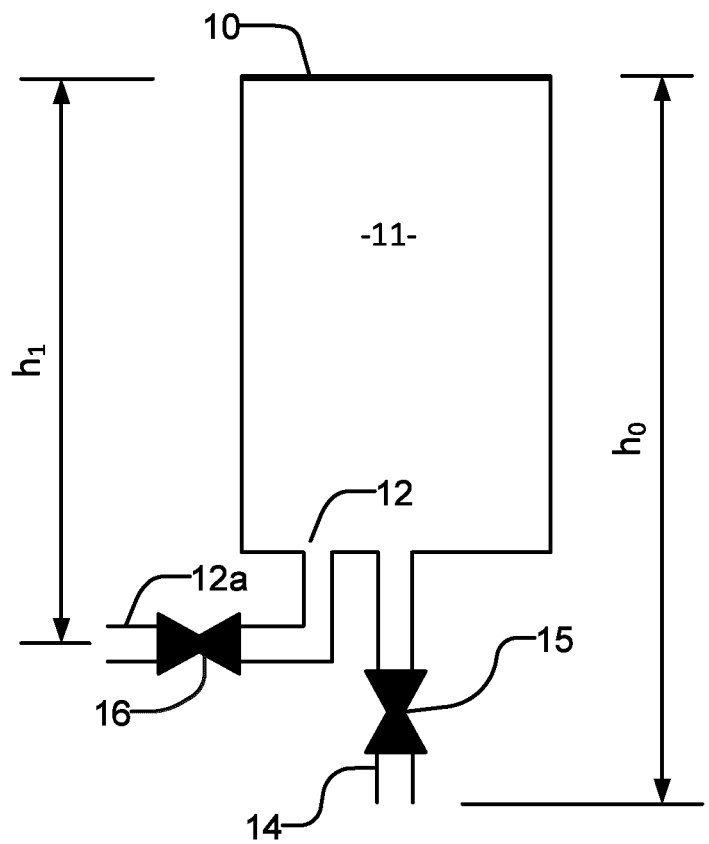
FIG. 1A is a schematic diagram illustrating pressure distribution in a liquid within a tank.
Figure 1B:
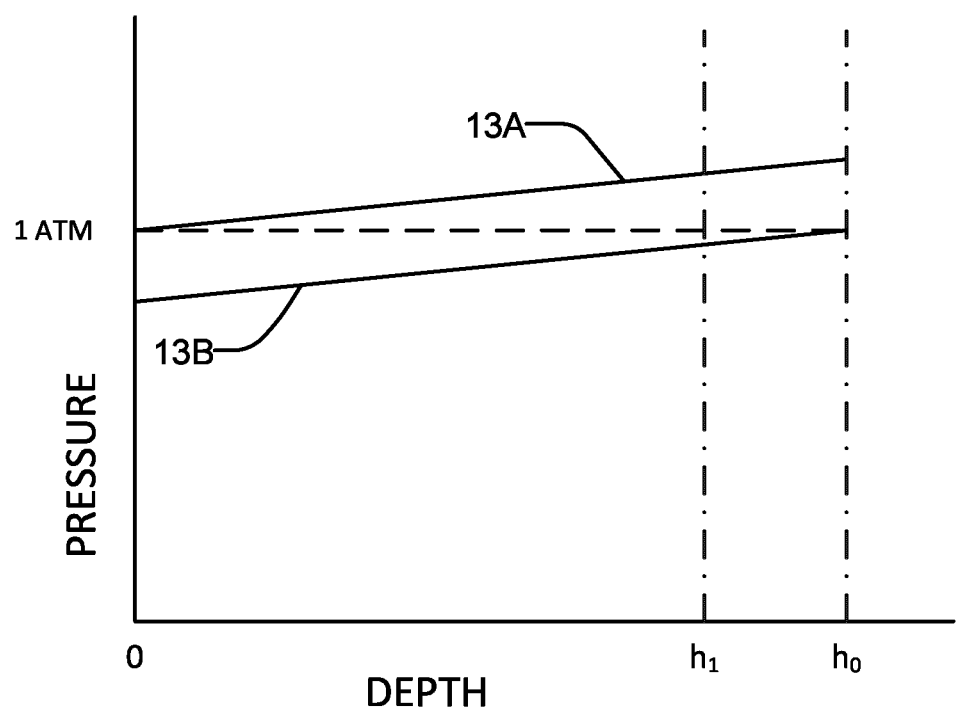
FIG. 1B is a graph showing the pressure distribution as a function of depth in a tank for cases where a drain valve is closed and opened.

FIG. 1A shows a tank 10 which contains a liquid 11. At a depth h below the surface of liquid 11 the absolute pressure profile in liquid 11 is given by:

$$P(h) = P_o + \rho g h \qquad (1)$$

Where P(h) is the pressure in liquid 11 as a function of depth h, h is defined above, Po is the absolute pressure at the top surface of liquid 11 (e.g. atmospheric pressure), ρ is the density of liquid 11 (1 gram/cm³ for water), and g is the acceleration of gravity. Since P(h) is greater than atmospheric pressure for any non-zero depth h, air or any other gas would need to be compressed (e.g. by a suitable pump, blower or the like) to enter the tank via a port 12. Curve 13A in FIG. 1B is a plot of pressure vs. depth as given by Eqn. (1).

Tank 10 has a drain line 14 normally closed by a valve 15. When valve 15 is opened, liquid 11 is exposed to the pressure in drain line 14 which is typically atmospheric pressure. Since tank 10 is closed and liquid 11 is not expandable, a new pressure profile is reached after valve 15 is opened. This new pressure profile at depth h within tank 10 is given by $$P(h) = P_1 - \rho g (h_0 - h) \qquad (2)$$

Where $P_1$ is the absolute pressure below liquid 11 in drain line 14 (e.g. atmospheric pressure at an outlet of drain line 14), $h_0$ is the depth at which liquid 11 is exposed to pressure $P_1$ (e.g. the depth of an outlet of the drain line), and the other elements of Eqn. 2 are as described above.

Curve 13B in FIG. 1B shows the variation of pressure with depth according to Eqn. 2 for the case where $P_1$ is atmospheric pressure. It can be seen that at the depth of a gas inlet 12a located at a depth $h_1 < h_0$, $P(h_1)$ is lower than atmospheric pressure. Therefore, gas supplied to gas inlet 12a at atmospheric pressure will be drawn into tank 10 through port 12 when valve 15 is opened. The gas will form bubbles which rise from port 12. As gas enters tank 10, liquid 11 is displaced such that liquid 11 can escape from tank 10 through drain line 14.

The above effect may be applied to introduce gas bubbles into tank 10. Advantageously a compressor or other device for increasing pressure of the gas is not required. In some embodiments gas is introduced into tank 10 at plural locations (simultaneously and/or at different times). In some embodiments a diffusion structure is provided to cause gas bubbles to pass through elected parts of tank 10.

In an example embodiment bubbles are introduced into tank 10 by periodically performing a cycle which includes:
  a. Stopping a supply of liquid 11 to tank 10,
  b. Opening drain valve 15 and supplying gas at port 12. Supplying the gas at port 12 may comprise opening a gas supply valve 16 in some cases,
  c. Allowing the gas to be drawn into tank 10 via port 12 to form bubbles in tank 10 as liquid 11 drains via drain line 14,
  d. Closing drain valve 15, and
  e. Refilling tank 10 with liquid 11. In some cases refilling tank 10 with liquid 11 comprises venting gas that has collected at the top of tank 10. Refilling tank 10 may comprise but does not necessarily involve completely filling tank 10 with liquid 11.

Apparatus for performing methods as described above may take various forms. Non-limiting examples of these various forms are described below.

Figure 2A:
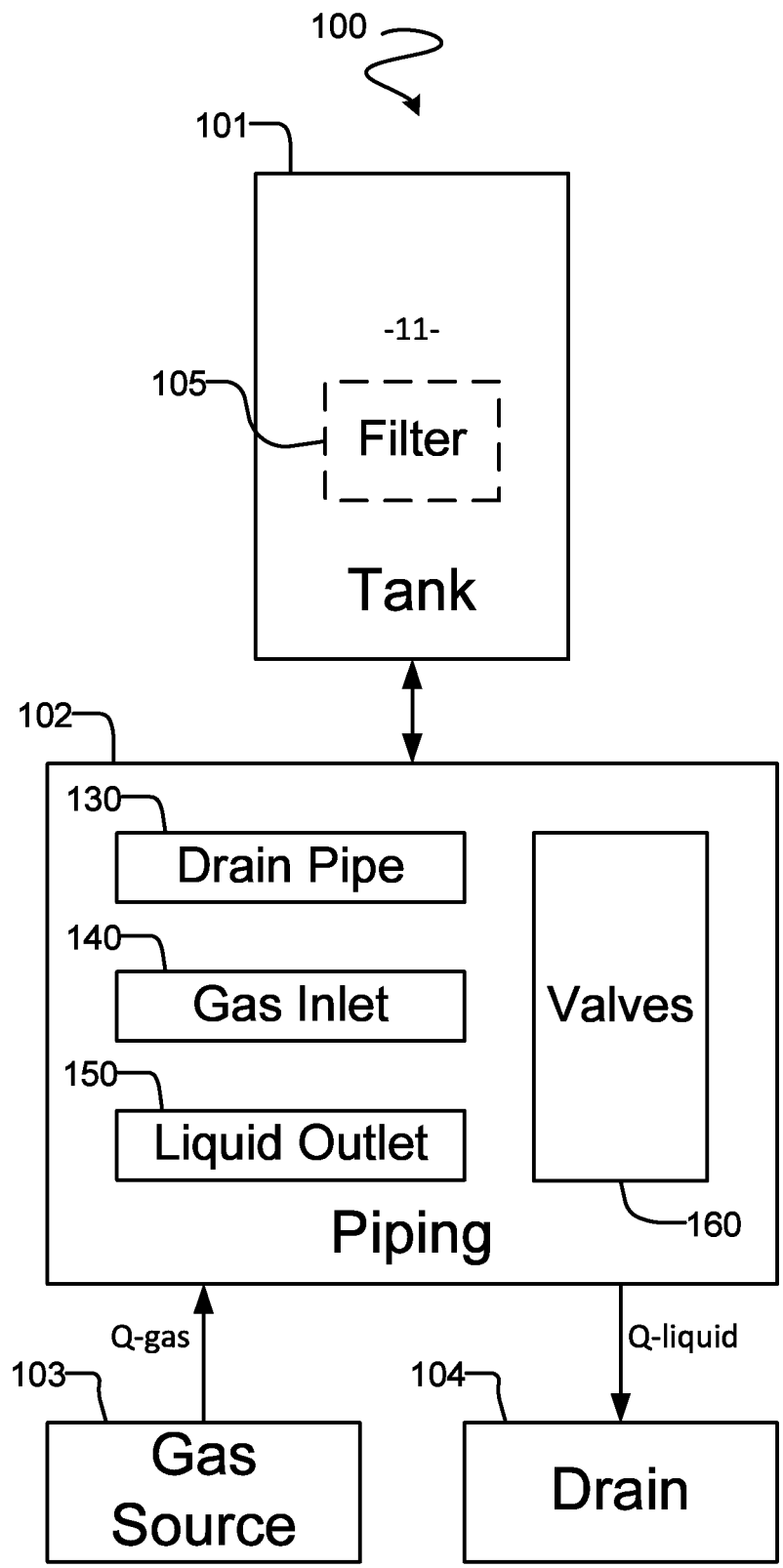
FIG. 2A is a block diagram of a system for introducing gas into a tank containing liquid according to an example embodiment of the invention.

FIG. 2A is a block diagram of an example system 100 comprising tank 101 connected to gas source 103 and drain 104 through piping 102. Tank 101 holds liquid 11. The top of tank 101 is generally closed to the atmosphere. A filter 105 or other apparatus is optionally present within tank 101.

Piping 102 is arranged to selectively allow fluids to enter and leave tank 101. Piping 102 includes drain pipe 130, gas inlet 140 for receiving gas from gas source 103, liquid outlet 150 for carrying liquid 11 to drain 104, and valves 160. Gas source 103 may comprise the atmosphere or other suitable source of air or another gas.

Valves 160 are configured to regulate fluid flow between tank 101 and gas source 103, tank 101 and drain 104 and/or tank 101 and the atmosphere. In particular, valves 160 can be configured to cause a reduced pressure at gas inlet 140 by providing a fluid connection for liquid 11 to exit tank 101 to drain 104 through liquid outlet 150 and to allow tank 101 to receive gas from gas source 103 through gas inlet 140. In some embodiments gas source 103 supplies air or another gas at atmospheric pressure and the reduced pressure at gas inlet 140 is below atmospheric pressure.

As described above, switching valves 160 to provide a path by which liquid 11 can flow down piping 102 to drain 104 under the influence of gravity alters the absolute pressure profile within tank 101. This causes pressure to be reduced at gas inlet 140. The pressure profile within tank 101 may provide a partial vacuum (e.g. the pressure in at least some elevations in tank 101 is below the ambient pressure outside of system 100). The reduced pressure facilitates entry of gas through gas inlet 140. Gas inlet 140 may be located at an elevation higher than liquid outlet 150 so that the partial vacuum extends to the location of gas inlet 140. Since gas has a lower density than liquid 11, the gas drawn from gas source 103 will rise semi-continuously as bubbles in piping 102 and enter tank 101 as liquid 11 exits tank 101 to drain 104.

Figure 2D:
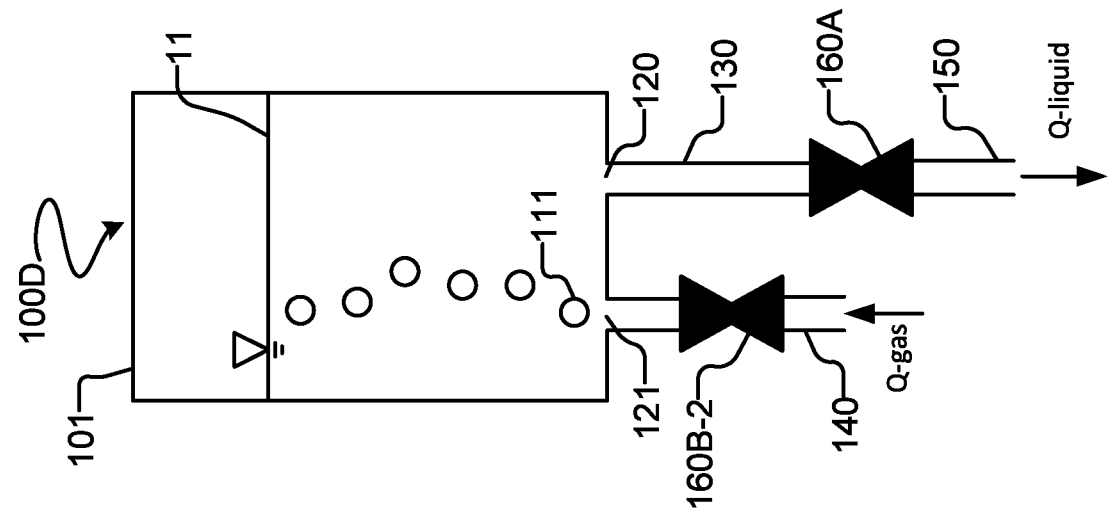
FIGS. 2B to 2D are schematic diagrams depicting several non-limiting example configurations of the FIG. 2A system.
Figure 2C:
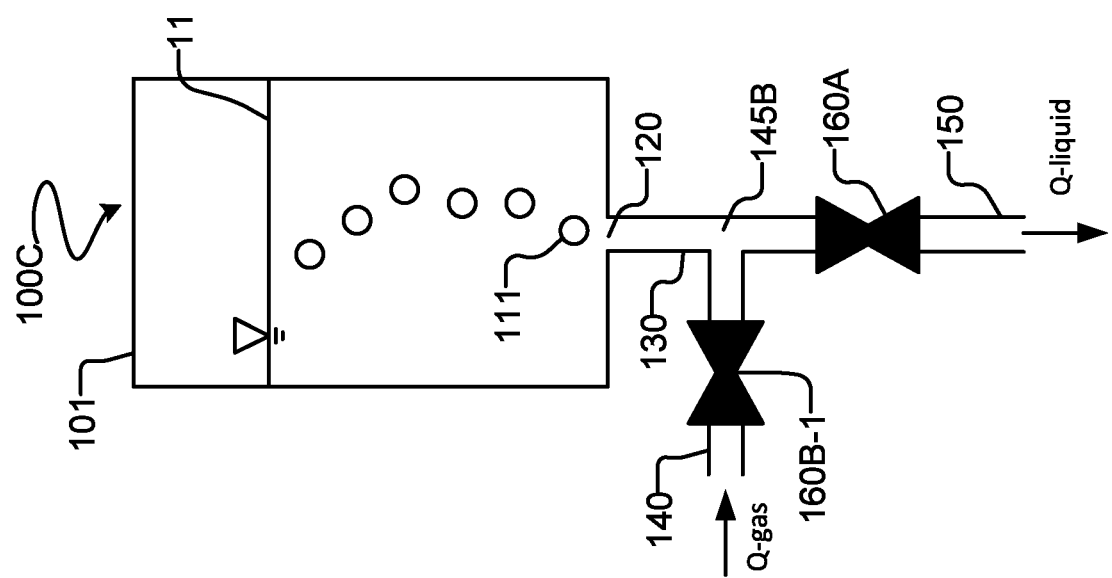
Figure 2B:
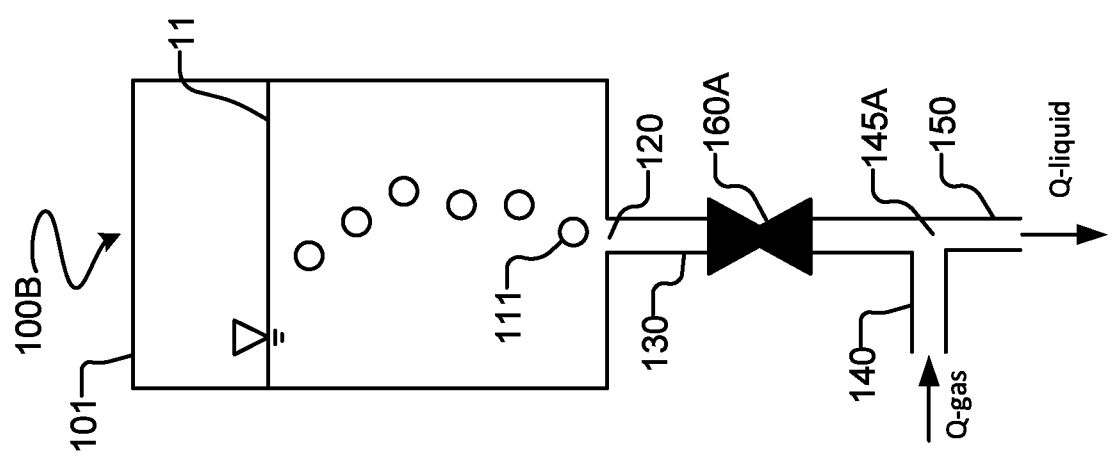

FIGS. 2B to 2D are schematic diagrams depicting some possible example configurations of system 100. Systems 100B, 100C, 100D each comprise tank 101 connected to drain pipe 130 at drain port 120. In each case, tank 101 can receive gas from gas inlet 140 which is open to the atmosphere. Liquid 11 can exit tank 101 via liquid outlet 150 to a drain.

In system 100B, drain pipe 130, gas inlet 140 and liquid outlet 150 are mutually connected at junction 145A below tank 101. Gas which forms bubbles 111 is introduced to liquid 11 through drain port 120 by switching drain valve 160A from its closed position to its open position. When drain valve 160A is switched from its closed position to its open position, liquid 11 flows down drain pipe 130 through junction 145B and liquid outlet 150 under the influence of gravity. To facilitate allowing liquid 11 to descend to liquid outlet 150 it can be advantageous to have some gas at the top of tank 101 which can expand as liquid 11 is pulled toward liquid outlet 150.

Positioning gas inlet 140 at an elevation higher than liquid outlet 150 ensures that the partial vacuum forms at the location of junction 145A. The partial vacuum can draw air or other gas into tank 101 through gas inlet 140. Air rises through drain pipe 130 as liquid 11 flows down drain pipe 130 through drain valve 160A to liquid outlet 150. The air rises through tank 101 as bubbles 111. When drain valve 160A is switched from its open position to its closed position, liquid 11 stops flowing through drain pipe 130. The partial vacuum at junction 145A dissipates as a result, and air ceases to be drawn into gas inlet 140. The rate of generation of bubbles 111 may optionally be controlled by throttling the supply of gas to gas inlet 140 (e.g. by controlling a valve that regulates supply of gas to gas inlet 140)

and/or throttling the flow of liquid 11 to liquid outlet 150 (e.g. by controlling drain valve 160A or another variable valve in drain pipe 130).

In system 100C, drain pipe 130, gas inlet 140 and liquid outlet 150 are mutually connected to each other at junction 145B below tank 101. Drain valve 160A is located between liquid outlet 150 and junction 145B. System 100C further comprises gas supply valve 160B-1 between gas inlet 140 and junction 145B. Air which forms bubbles 111 is introduced through drain port 120 by opening drain valve 160A and gas supply valve 160B-1. In some embodiments drain valve 160A is opened slightly before gas supply valve 160B-1 such that the partial vacuum is already provided when gas supply valve 160B-1 is opened. Since gas inlet 140 is located at a higher elevation than liquid outlet 150, a partial vacuum will form at junction 145B. When this occurs, the pressure inside tank 101 at junction 145B decreases below the pressure of gas at gas inlet 140 (e.g. atmospheric pressure). The partial vacuum facilitates drawing air into tank 101 through gas inlet 140.

System 100D is similar to system 100C except that it comprises a gas port 121 separate from drain port 120. Gas inlet 140 and gas port 121 are connected through gas supply valve 160B-2. Gas supply valve 160B-2 can be opened to allow gas to enter tank 101 when the pressure within tank 101 is at a level that provides a partial vacuum adjacent to gas port 121. Liquid outlet 150 and drain port 120 are connected through drain valve 160A. Gas inlet 140 is in fluid communication with liquid outlet 150 when drain valve 160A and gas supply valve 160B-2 are opened. Since gas inlet 140 is located at a higher elevation compared to liquid outlet 150, a partial vacuum will form at the location of gas inlet 140 when valve 160A is opened and tank 101 is otherwise closed. Gas which forms bubbles 111 is introduced through gas port 121 by switching drain valve 160A and gas supply valve 160B-2 from their respective closed positions to their respective open positions.

As above, in some embodiments drain valve 160A is opened slightly before gas supply valve 160B-2 such that the partial vacuum is already provided when gas supply valve 160B-2 is opened. When drain valve 160A and gas supply valve 160B-2 are opened, the partial vacuum draws air from gas inlet 140 into tank 101 through gas port 121 as liquid 11 is drained through drain port 120. Bubbles 111 rise from gas port 121 through tank 101.

In many applications it is desirable to keep tank 101 full of liquid 11 to a desired level at most times and to periodically introduce bubbles into tank 101 for a purpose such as cleaning a filter, mixing liquid 11, or the like. For such applications it is desirable to provide a mechanism whereby tank 101 can be refilled with liquid 11 (to the desired level) after gas has been introduced into tank 101, for example as described above. For example, tank 101 may be completely filled, substantially filled, or filled to a level that is less than a maximum capacity of tank 101. A wide range of mechanisms may be provided to facilitate refilling tank 101 with liquid 11. In general, what is needed is a way to remove the gas that has entered tank 101 in the form of bubbles 111 and to provide liquid 11 to refill tank 101.

Figure 3A:
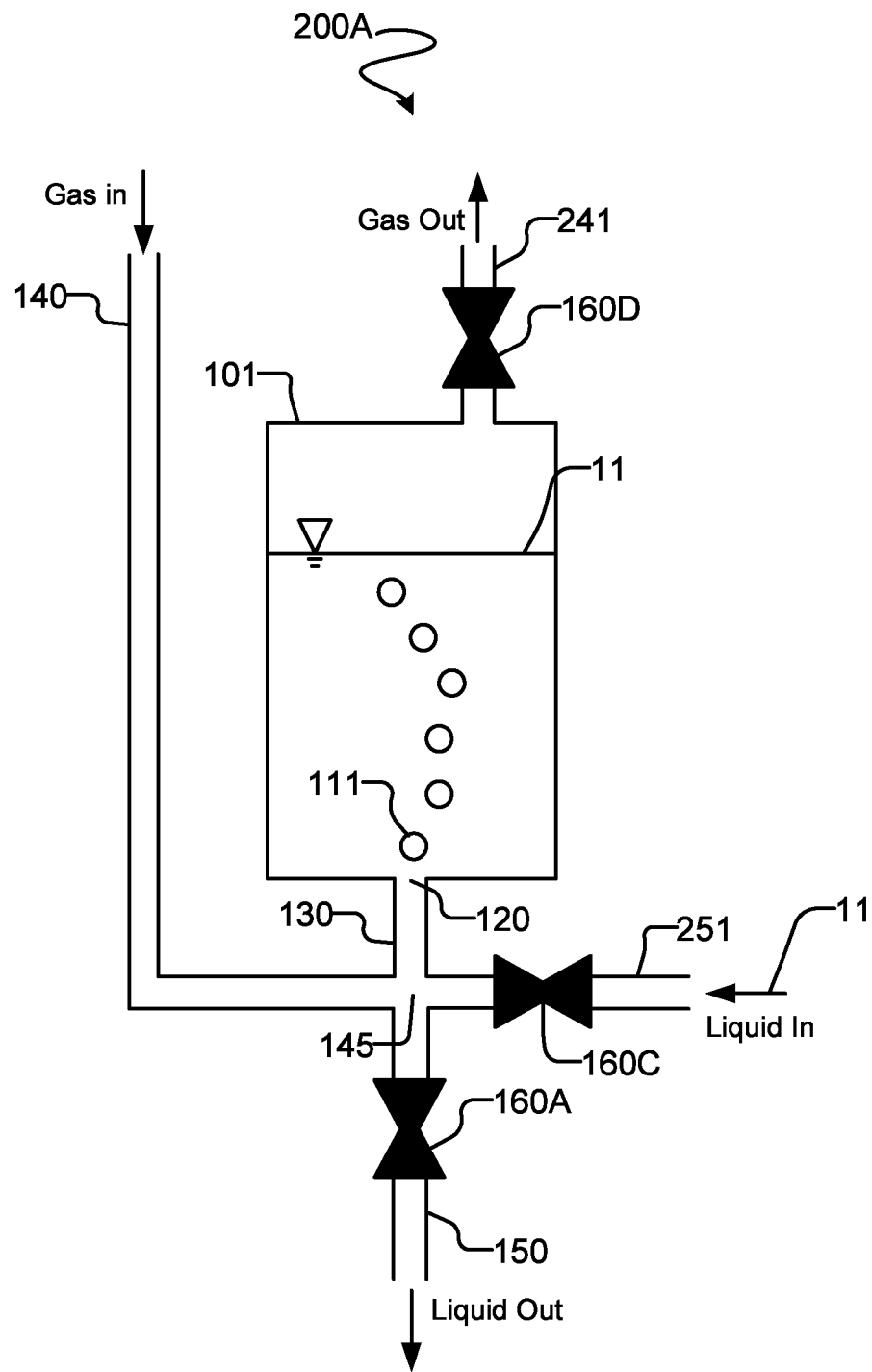
FIGS. 3A to 3B are schematic diagrams depicting the introduction of gas to tanks that can be filled with liquid and drained according to example embodiments of the invention.
Figure 3B:
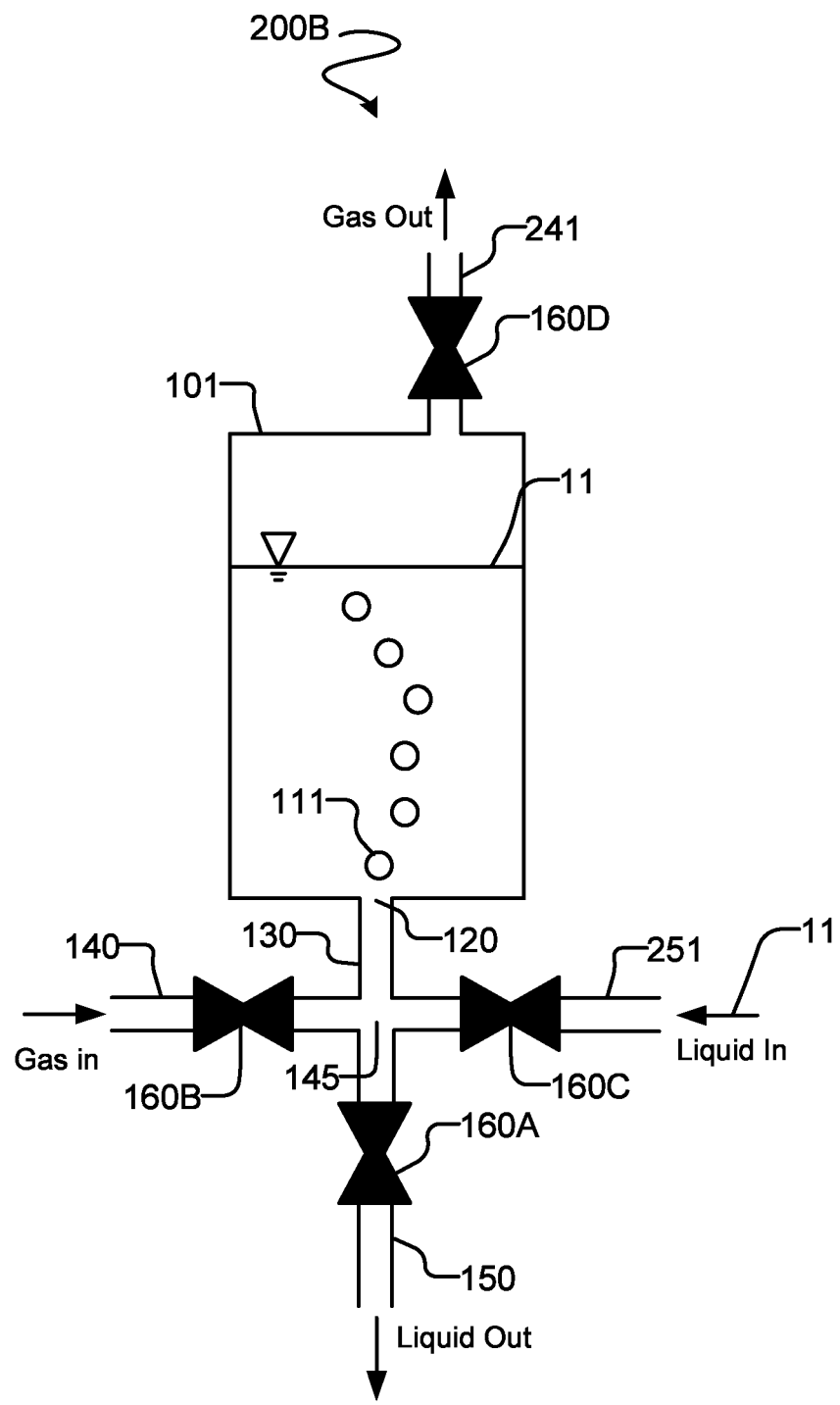
Figure 3C:
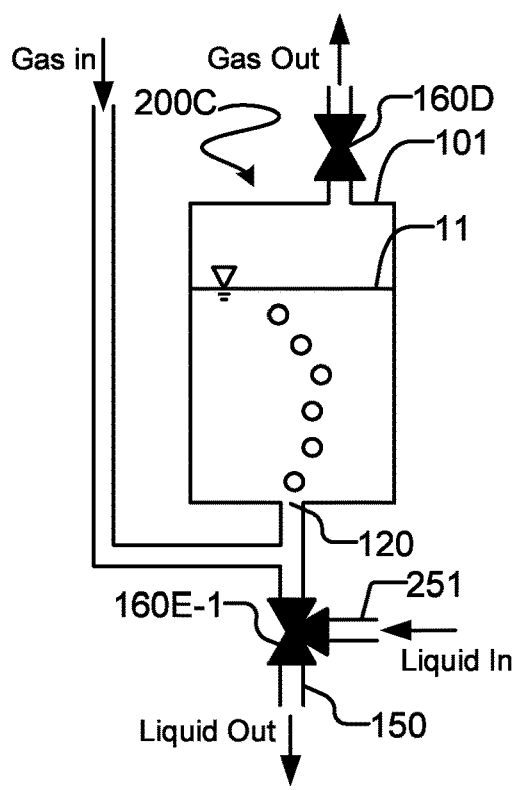
FIGS. 3C to 3F are schematic diagrams depicting tanks that can be filled with liquid and drained using 3-way valves according to example embodiments of the invention.
Figure 3D:
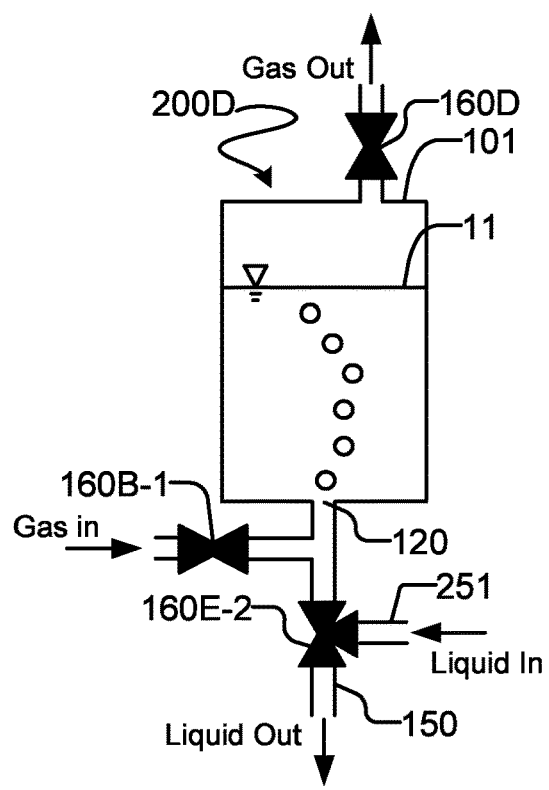
Figure 3E:
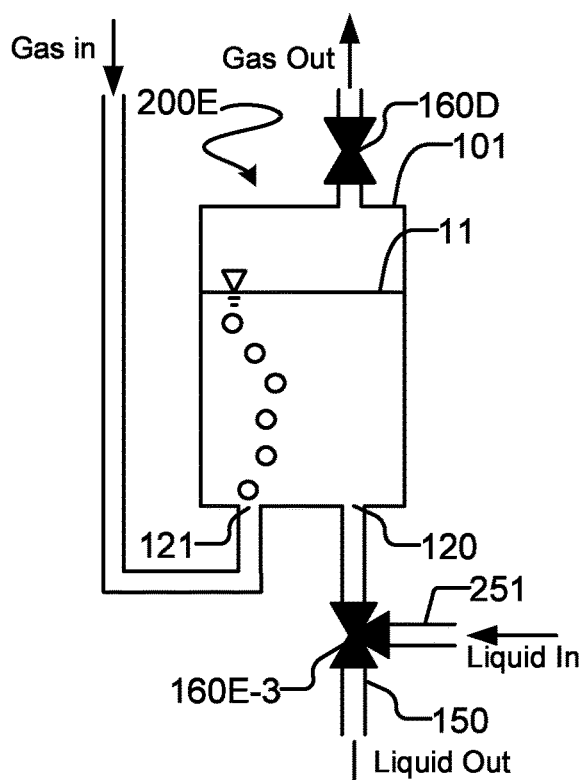
Figure 3F:
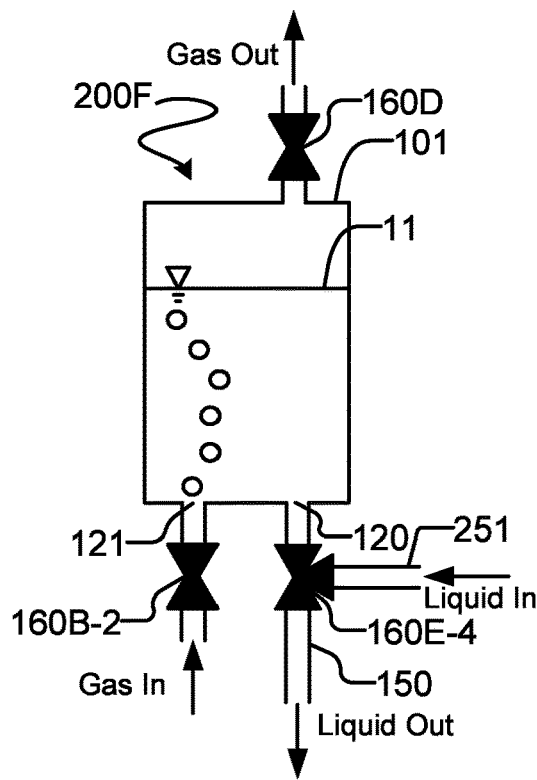

FIGS. 3A and 3B are schematic diagrams respectively depicting example systems 200A and 200B which include mechanisms for filing and draining tank 101 with liquid 11 according to example embodiments. Systems 200A, 200B comprises elements similar to those found in systems 100B, 100C, 100D, such as: tank 101, drain port 120, drain pipe 130, gas inlet 140, liquid outlet 150 and drain valve 160A.

Systems 200A, 200B further comprise gas vent 241, liquid inlet 251, liquid inlet valve 160C and gas vent valve 160D.

Valves 160 are operable between open positions permitting fluid flow and closed positions preventing fluid flow. Gas vent 241 may be located at the top of tank 101. Tank 101 is open to the atmosphere when gas vent valve 160D is open. Tank 101 is closed to the atmosphere when gas vent valve 160D is closed.

Drain pipe 130, gas inlet 140, liquid outlet 150 and liquid inlet 251 may optionally be mutually connected to each other at junction 145 below tank 101. Gas inlet 140 may receive gas from the atmosphere or other fluid sources. Liquid inlet 251 may receive liquid from a raw water tank or other liquid sources. Liquid outlet 150 may be connected to a suitable drain or vessel for receiving liquid 11.

In system 200A gas inlet 140 comprises a pipe that opens to atmosphere at a level that is above the hydraulic head of liquid 11. Other embodiments may also use this construction for a gas inlet 140. With this construction a valve is not required between junction 145 and gas inlet 140. The opening of gas inlet 140 is positioned at an elevation that is high enough so that liquid 11 does not exit through gas inlet 140 when tank 101 is being filled or drained. Positioning the opening of gas inlet 140 at an elevation that is higher than the hydraulic head of liquid 11 in tank 101 prevents liquid 11 from flowing through gas inlet 140 as tank 101 is being drained or filled.

System 200A may be configured to fill tank 101 with liquid 11 by closing drain valve 160A and opening gas vent valve 160D and liquid inlet valve 160C. This allows input liquid 11 to enter tank 101 from liquid inlet 251 through drain port 120 as air is purged from tank 101 through gas vent 241. When tank 101 is filled to a desired level with liquid 11 gas vent valve 160D may be closed. In some embodiments, tank 101 may be fully filled to provide large volumes of liquid 11 to be drained to thereby facilitate drawing in large volumes of gas into tank 101 when liquid 11 is drained.

System 200B is similar to system 200A except that gas is delivered to tank 101 by way of a gas supply valve 160B located between junction 145 and gas inlet 140. Gas supply valve 160B may be closed while tank 101 is being filled to prevent liquid 11 from flowing into gas inlet 140.

Bubbles 111 may be introduced into tank 101 of system 200B by closing gas vent valve 160D and liquid inlet valve 160C and opening drain valve 160A and gas supply valve 160B. As above, gas supply valve 160B is opened slightly later than drain valve 160A in some embodiments. Since gas inlet 140 is located at an elevation that is higher than liquid outlet 150, a partial vacuum will form at the location of gas inlet 140 when drain valve 160A is opened and tank 101 is otherwise closed. When gas supply valve 160B is open the partial vacuum will draw air through gas inlet 140 to introduce bubbles 111 into tank 101.

In some embodiments, some or all of valves 160 may comprise check valves which allow fluid flow in only one direction. For example, gas supply valve and/or gas vent valve 160D may include a check valve which allows air to flow out of but not into tank 101. In such embodiments separate manual or automatic operation of gas supply valve 160B and/or gas vent valve 160D is not required.

In the FIG. 3A embodiment, only drain valve 160A and liquid inlet valve 160C have to be controlled if gas vent valve 160D is a check valve. To fill tank 101 with liquid 11, liquid inlet valve 160C is opened and drain valve 160A is closed. Air is purged from tank 101 through gas vent valve 160D (which is a check valve) to allow input liquid 11 to enter tank 101 through drain port 120. When tank 101 is filled to a desired level (e.g. full) liquid inlet valve 160C may be closed. To drain liquid 11 from tank 101, drain valve 160A and liquid inlet valve 160C are respectively opened and closed. Liquid 11 is then drained through liquid outlet 150 as air enters into tank 101 through gas inlet 140 and gas vent valve 160D (which is a check valve) remains closed.

In some embodiments a multi-way valve is provided to perform the functions of two or more of drain valve 160A, gas supply valve 160B and liquid inlet valve 160C. For example, drain valve 160A and liquid inlet valve 160C may be replaced with a 3-way valve 160E. FIGS. 3C-F are schematic diagrams depicting example systems 200C, 200D, 200E, 200F in which 3-way valves 160E are used in place of separate drain valve 160A and liquid inlet valve 160C to regulate flow of liquid into and out of tank 101.

In the FIGS. 3C-3F embodiments, 3-way valves 160E are respectively operable between at least a first position permitting fluid flow between tank 101 and liquid outlet 150 while preventing fluid flow between tank 101 and liquid inlet 251, and a second position permitting fluid flow between tank 101 and liquid inlet 251 while preventing fluid flow between tank 101 and liquid outlet 150. In other embodiments, 3-way valve 160E may comprise different and/or additional positions depending on its configuration in relation to other components of system 200.

In the FIGS. 3A-D embodiments, air addition, liquid addition and liquid drain occur through a single drain port 120 at the bottom of tank 101. In the FIGS. 3E and 3F embodiments, air addition occurs through gas port 121 at the bottom of tank 101 while liquid addition and liquid drain occur through drain port 120 at the bottom of tank 101. Air addition, liquid addition and liquid drain can occur through different and/or multiple ports that enter tank 101 through the same or different surfaces of tank 101.

Membrane Filtration Applications

As described above, one application of the present invention is liquid filtration. For example, a tank as described herein may contain a filter or filters and bubbles may be periodically introduced into the tank in manners as described herein to assist in cleaning the filters. An example application is filtering water.

Figure 4A:
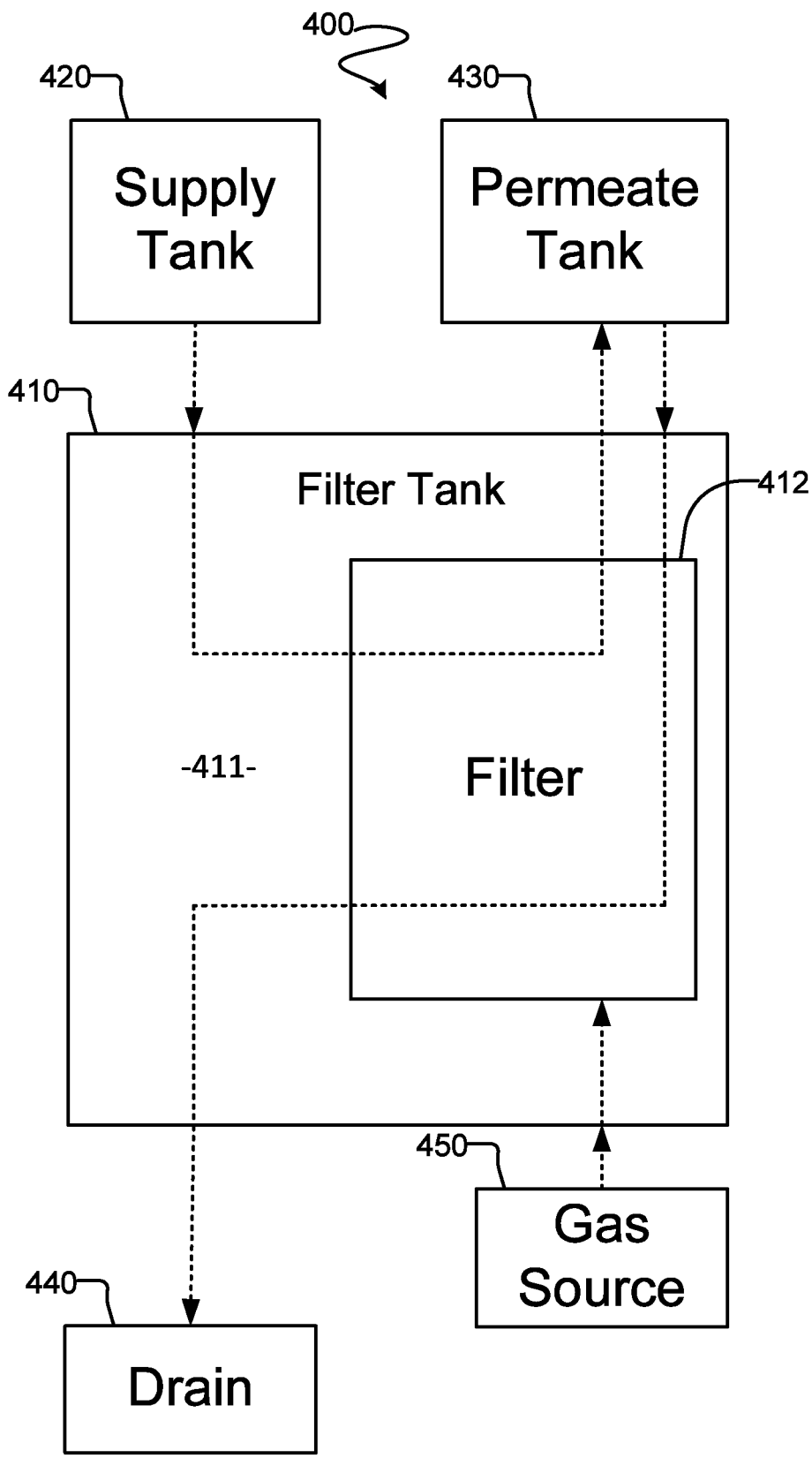
FIG. 4A is a block diagram of a membrane filtration system according to an example embodiment of the invention.

FIG. 4A is a block diagram of an example membrane filtration system 400 according to an example embodiment of the invention. Membrane filtration system 400 comprises filter tank 410 (e.g. membrane module) which is connected to receive raw water 411 (or other liquids) from supply tank 420 (e.g. a raw water tank) and to output filtered liquid to permeate tank 430. Filter tank 410 may, for example, be configured based in part or in whole on any of the various tank 101 and piping 102 configurations shown in FIGS. 2A to 2D and FIGS. 3A to 3F or combination of features of different ones of these configurations.

Filter tank 410 comprises filter 412 which may comprise, for example, a membrane filter. Filter tank 410 may be filled with water 411. Water 411 may be delivered to filter tank 410 from supply tank 420 or other water sources. Water 411 may be filtered by passing through filter 412 and delivered to permeate tank 430.

Filter tank 410 may be constructed as described herein to take in gas (e.g. air) from a gas source 450 and to allow that gas to form bubbles in filter tank 410 to clean filter 412. The bubbles clean filter 412 by providing aeration to thereby mix and dislodge foulants accumulated in tank 410. Water 411 may be drained from filter tank 410 as the gas flows into filter tank 410 such that foulants dislodged by the bubble treatment are removed from filter tank 410 by way of drain 440.

Advantageously the reduction in pressure that occurs within filter tank 410 when the tank is drained can help to draw water 411 backward through filter 412. Such backwashing can help to clean filter 412. Backwashing generally refers to the process of reversing permeate flow to remove foulants accumulated at the surface of a porous membrane filter. In system 400, backwashing comprises flowing water from permeate tank 430 through filter 412 back into filter tank 410. Some or all of the water can subsequently be drained out of filter tank 410 by way of drain 440.

The size and dimensions of filter tank 410 may be selected according to the application and/or the specifications of filter 412. Filter 412 may be selected to have properties desired for a specific application such as appropriate pore sizes, membrane materials (e.g. PVDF), membrane geometry, filtration areas, etc.

A membrane filtration system (e.g. water treatment system) may operate plural filter tanks 410 in parallel. For example, multiple filter tanks 410 may be racked in an m×n matrix, where m represents the number of rows and n represents the number of columns. Such configurations are easily expandable and may advantageously save space. All or any of the plural filter tanks may be constructed and operated as described herein.

Filter tank 410 and filter 412 may be provided in the form of a commercially available membrane filter assembly such as those marketed under the trademarks Hydranautics™ HYDRAcap® MAX 40, Suez™ ZeeWeed 1500, Igne™ Multibore®, etc.

Drain 440 may connect to a sewer, pond, wastewater storage, water discharge or the like. In some embodiments, water that is drained from filter tank 410 through drain 440 is collected and recycled. The recycled water may be fed back into filter tank 410 and/or undergo additional water treatment processes. Gas source 450 may comprise the atmosphere or other suitable source of air or another gas.

Figure 4B:
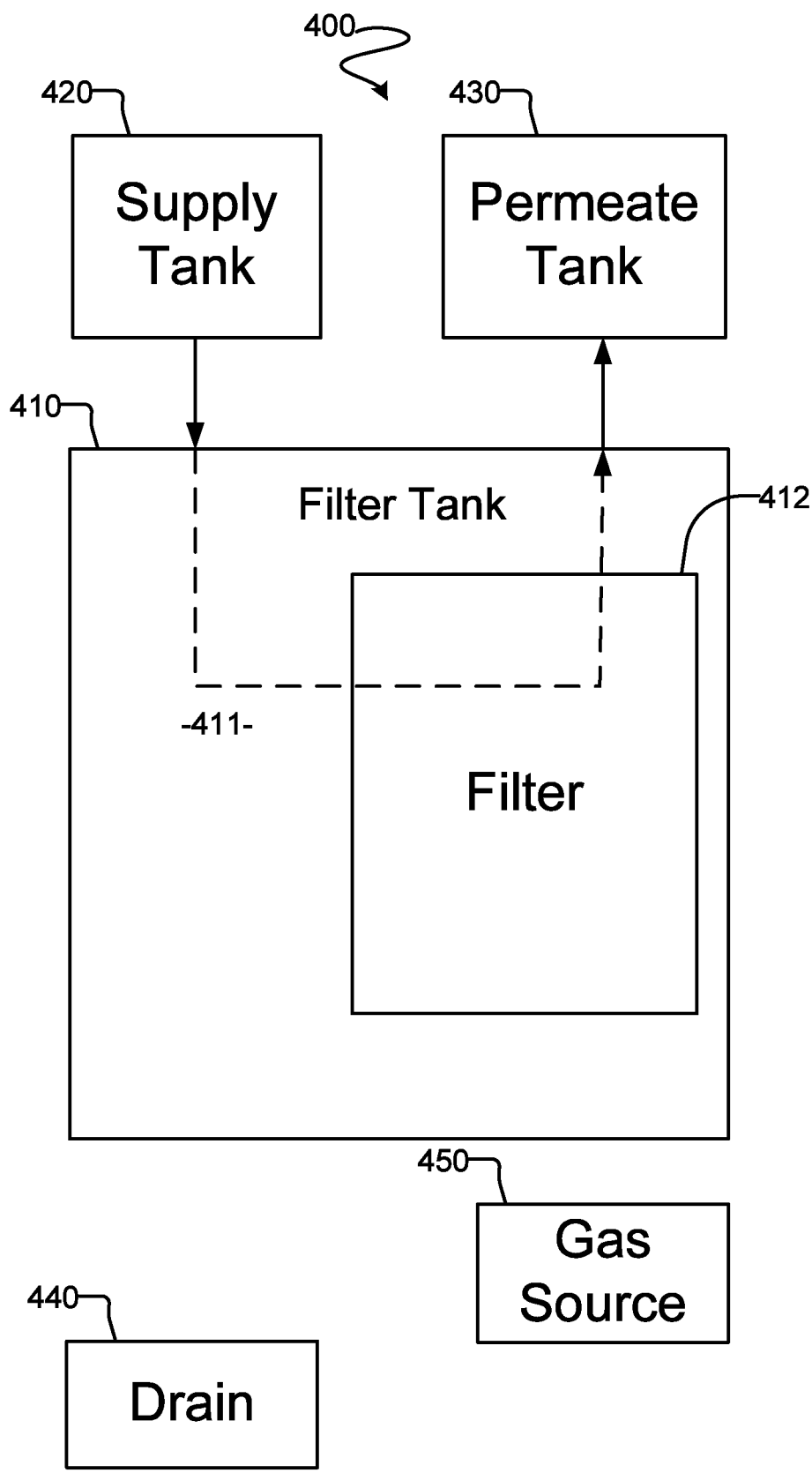
FIG. 4B is a block diagram showing a configuration of the FIG. 4A system during its permeation phase.

Membrane filtration system 400 may be configured to operate in a permeation phase and a cleaning phase. In the permeation phase water 411 is filtered through filter 412 as indicated by the dashed line in FIG. 4B. Filter 412 may have any suitable construction. In some embodiments, water 411 supplied from supply tank 420 is exposed to an outside surface of filter 412 and permeate tank 430 receives filtered water from an inside surface of filter 412. In some embodiments, water 411 supplied from supply tank 420 is exposed to the inside surface of filter 412 and permeate tank 430 receives filtered water from the outside surface of filter 412.

Figure 4C:
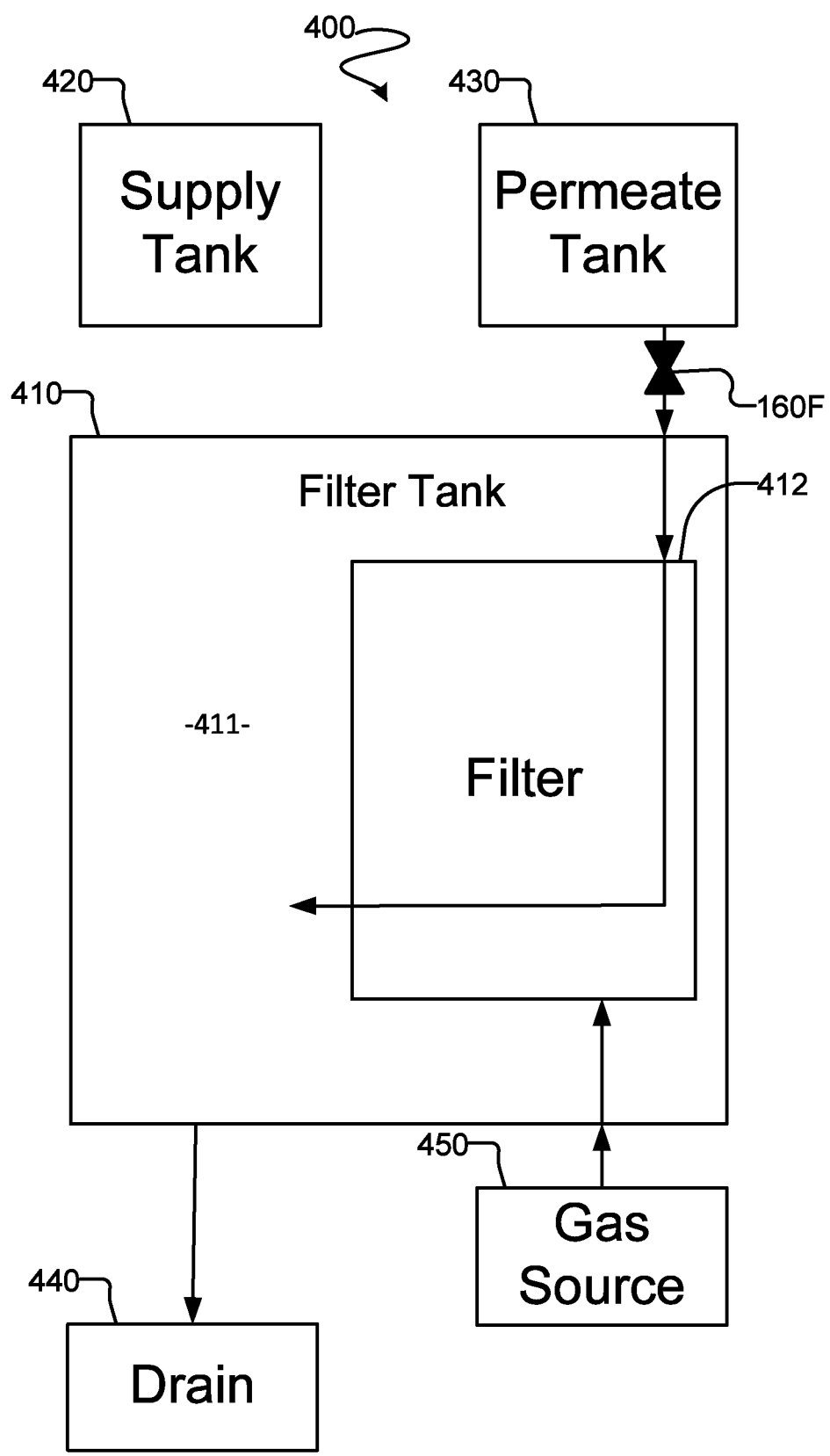
FIG. 4C is a block diagram showing a configuration of the FIG. 4A system during its cleaning phase.

In the cleaning phase (see FIG. 4C) filter tank 410 is closed and drained via drain 440. Gas bubbles from gas source 450 are drawn into filter tank 410. The action of the gas bubbles helps to clean filter 412 by agitating liquid that contacts filter 412 to dislodge and/or mix foulants accumulated on filter 412 and in tank 410. Optionally, filter 412 is backwashed during all or part of the cleaning phase.

An optional valve 160F between filter 412 and permeate tank 430 may be selectively opened to allow backwashing or closed to prevent backwashing. In some cases valve 160F, when present may be partially opened during all or part of the cleaning phase to control the rate of backwashing. The cleaning phase serves to remove foulants that may have accumulated on filter 412 during the permeation phase. During the cleaning phase water 411 together with entrained foulants may be drained from filter tank 410 by way of drain 440.

A water filtering cycle may involve periodically switching between the permeation phase and the cleaning phase. The cleaning phase may be performed as often as required. The permeation phase and the cleaning phase may have different durations. For example, system 400 may undergo a 60 minute water filtering cycle comprising 50 minutes in the permeation phase followed by 10 minutes in the cleaning phase, a 24 hour water filtering cycle comprising 23 hours and 45 minutes in the permeation phase followed by 15 minutes in the cleaning phase, etc.

Figure 4D:
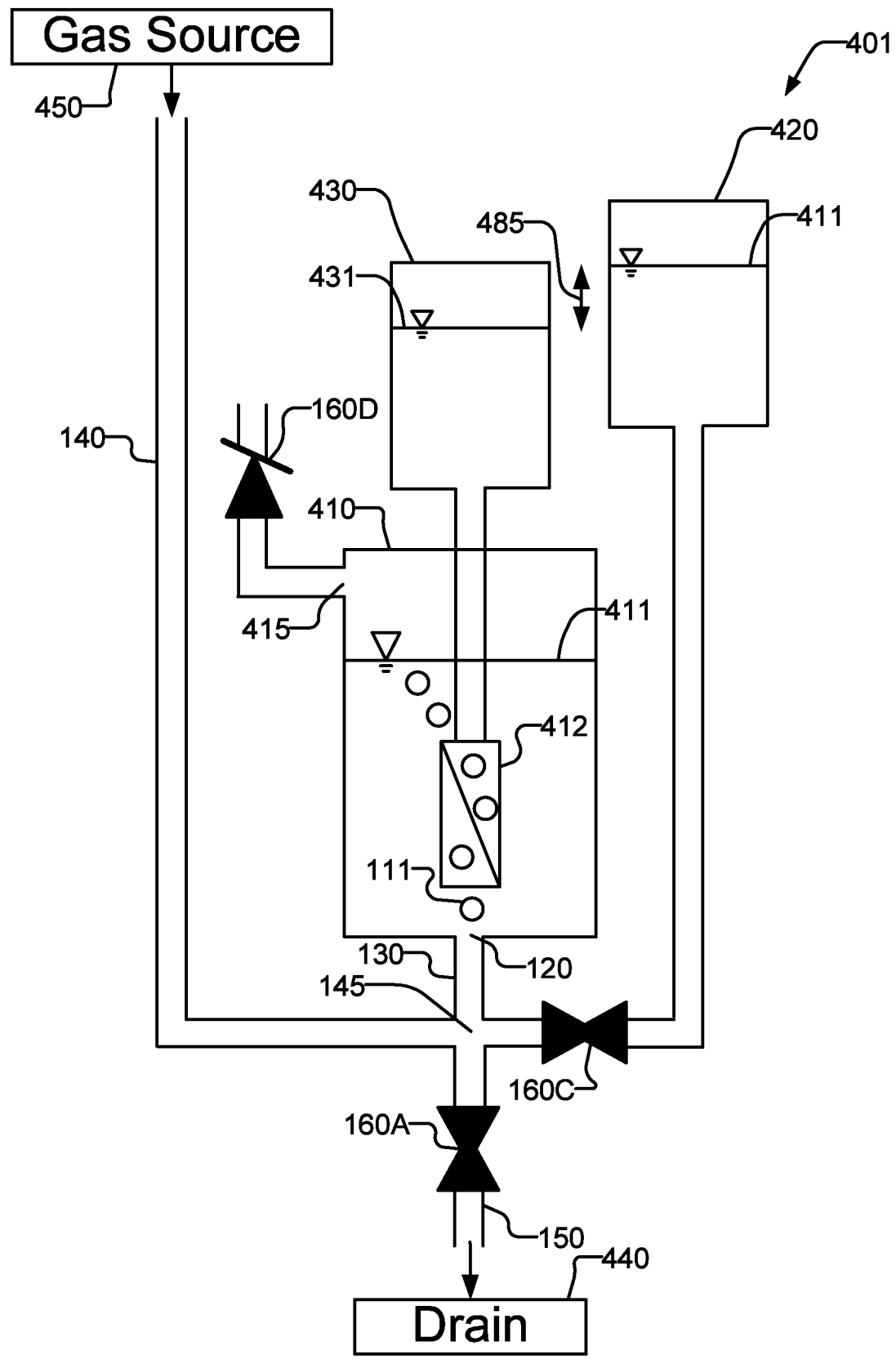
FIG. 4D is a schematic diagram of an example membrane filtration system comprising a fluid port at the bottom of a filter tank.

FIG. 4D is a schematic diagram of a membrane filtration system 401 according to an example embodiment. Membrane filtration system 401 comprises filter tank 410 which is connected to receive raw water 411 from supply tank 420 and to deliver filtered water 431 to permeate tank 430. In system 401, filter tank 410 is configured based on the tank 101 configuration shown in FIG. 3A. In other water filtration systems, filter tank 410 may be configured based in part or in whole on any suitable configurations shown in FIGS. 2A to 2D and FIGS. 3A to 3F, combinations of features from these embodiments, etc.

In system 401, filter tank 410 comprises a filter 412, a drain port 120 located below filter 412 and a gas vent port 415 at or near the top of filter tank 410. System 401 comprises drain valve 160-A and liquid inlet valve 160-C which respectively control whether water 411 can reach liquid outlet 150 and regulate flow of raw water 411 into filter tank 410. Gas vent valve 160D (which is a check valve in this case) allows air to be purged from filter tank 410 when it is desired to fill filter tank 410 with water 411.

System 401 may be operated in a permeation phase and a cleaning phase as described above. During the permeation phase, drain valve 160A is closed while liquid inlet valve 160C is open to allow water 411 to flow into filter tank 410.

Filter tank 410 may receive water 411 from supply tank 420 or directly from another suitable source of water. Water 411 is filtered by filter 412 and delivered to permeate tank 430. In some embodiments, difference 485 of the hydraulic heads of supply tank 420 and permeate tank 430 provides sufficient pressure differential to cause water 411 to flow though filter 412 into permeate tank 430.

During the cleaning phase, drain valve 160A is open and liquid inlet valve 160C is closed. As described above, this causes a reduction of pressure in tank 410 and at junction 145 where gas inlet 140 connects to drain pipe 130. The reduced pressure at junction 145 is lower than the gas pressure at gas inlet 140 (e.g. atmospheric pressure). The partial vacuum draws air into filter tank 410 through gas inlet 140. Air bubbles 111 rise inside of filter tank 410 to air scour filter 412. Materials scoured from filter 412 by the rising air bubbles 111 are removed from filter tank 410 as water 411 drains through drain port 120 to drain 440.

In some embodiments, a partial vacuum generated in filter tank 410 can advantageously facilitate enhanced backwashing of filter 412 by drawing treated water back through filter 412.

After filter tank 410 has been fully or partially drained, filter tank 410 may be refilled by closing drain valve 160A, opening liquid inlet valve 160C and opening gas vent valve 160D until filter tank 410 is filled to a desired level (e.g. full) of water 411 again.

Figure 4E:
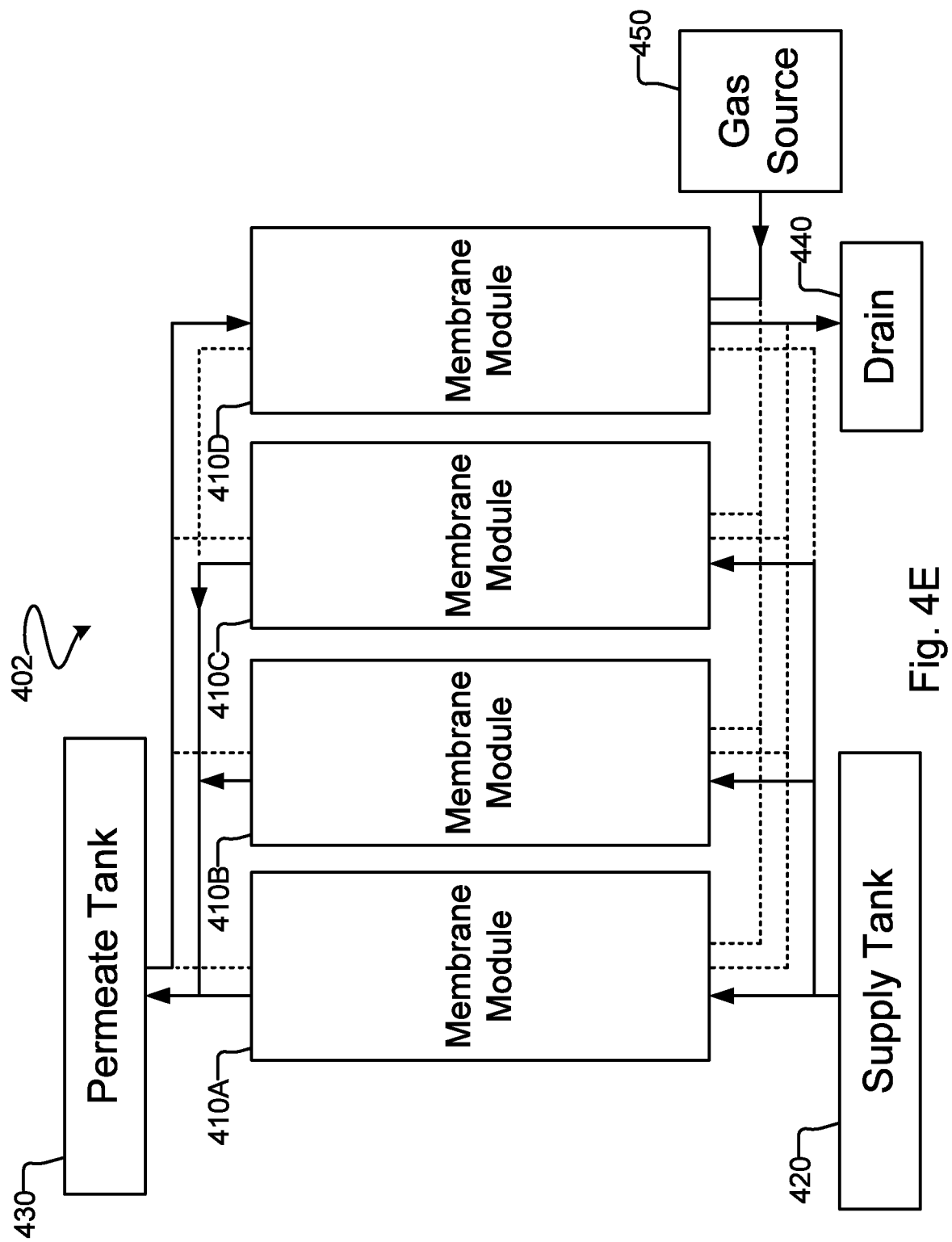
FIG. 4E is a block diagram of an example system comprising multiple filter tanks connected in parallel in which some membrane filters can be cleaned while other membrane filters filter a liquid according to an example embodiment of the invention.

In some embodiments comprising plural filter tanks 410 the filter tanks may be connected in a manner that allows some of the filter tanks to be operated in the permeation stage while others are being operated in the cleaning phase. FIG. 4E is a block diagram of membrane filtration system 402 comprising four membrane modules 410A, 410B, 410C, 410D, connected in parallel according to an example embodiment. In system 402, membrane modules 410A, 410B and 410C are being operated in permeation phases while membrane module 410D is being operated in a cleaning phase. Supply tank 420 delivers water to permeate tank 430 through membrane modules 410A, 410B, 410C while permeate tank 430 simultaneously provides treated water to backwash membrane module 410D. Gas source 450 may supply and deliver bubbles to air scour membrane module 410D during this process. The backwashing water flowing through membrane module 410D may be drained via drain 440 as gas source 450 delivers gas bubbles to membrane module 410D.

System 402 may comprise valves or other fluid regulating devices to control the rate of fluid flow in and out of membrane modules 410A, 410B, 410C, 410D. Such rates of fluid flow may be controlled independently from each other and/or automated through a controller.

Figure 5:
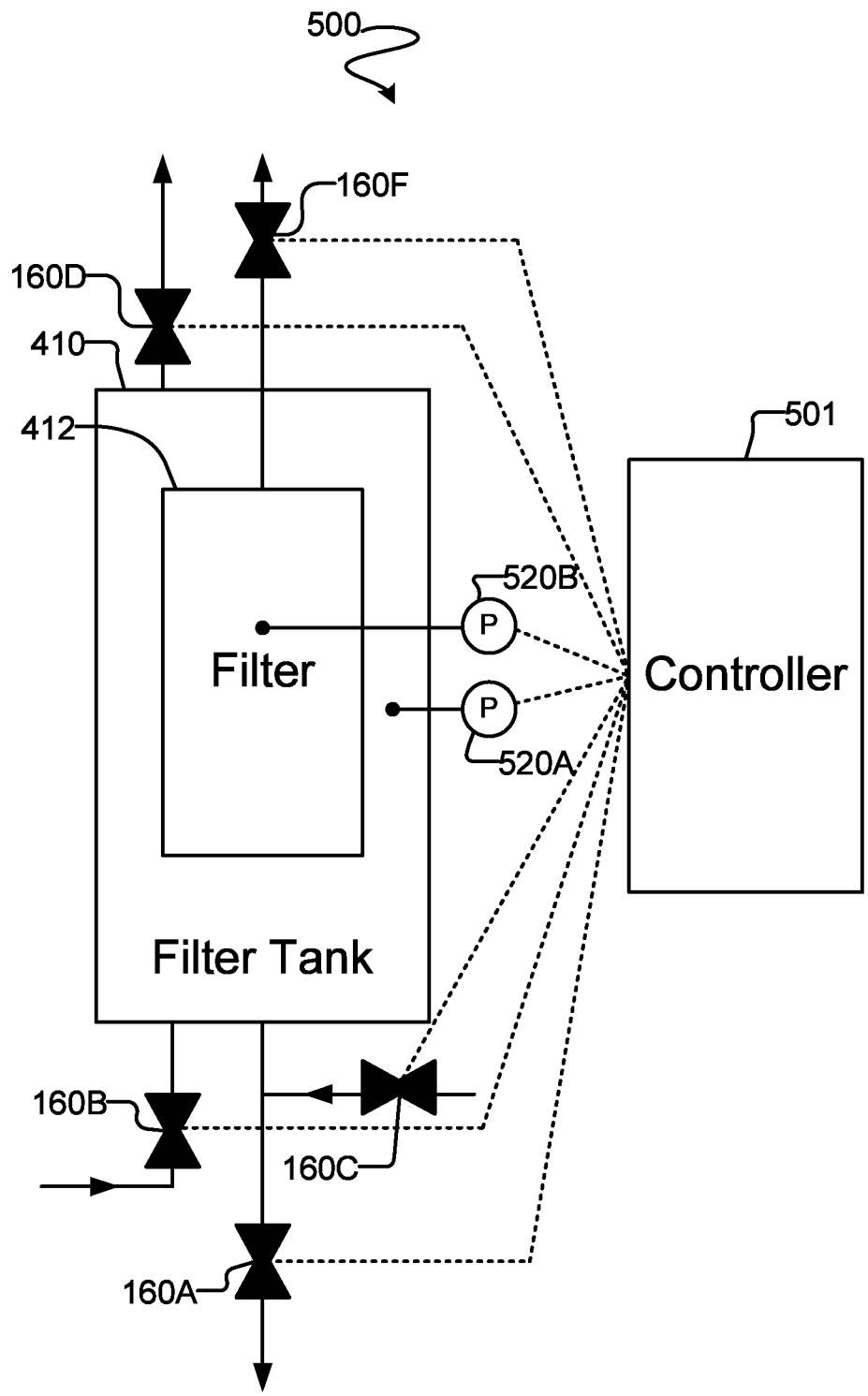
FIG. 5 is a block diagram of a system according to an example embodiment of the invention which includes a controller controlling multiple fluid regulating devices in a membrane filtration system according to an example embodiment.

FIG. 5 is a block diagram of a system 500 which includes a filter tank 410 containing a filter 412 and a controller 501 connected to control a plurality of valves 160 according to an example embodiment. Valves 160 may, for example, comprise solenoid valves, actuated ball valves, etc. Controller 501 is configured to control the valves to cause a gas to enter filter tank 410 by opening a drain valve 160A to cause a reduced static pressure at a port at which the gas can enter the liquid in the tank.

In the illustrated embodiment system 500 includes valves 160 which may be operated as described above. It is not mandatory that all of these valves be present or that, if present, all of these valves be controlled by controller 501. For example:

gas supply valve 160B may be unnecessary where gas source 450 comprises a conduit having an elevated inlet (as shown for example in FIG. 4D).

valves 160B and/or 160D may be replaced by check valves as described above.

valves 160A, 160B and 160C or any combination of two of these valves may be combined in a multi-way valve 160E (see FIGS. 3C to 3F).

Since the valves of system 500 can be operated in combinations to achieve desired outcomes such as the introduction of bubbles into tank 410 it is not mandatory that controller 501 is connected to individually control each controlled valve. In some embodiments two or more valves of system 500 are combined, ganged together or linked by mechanical linkages such that controller 501 can operate plural valves with one control output.

Controller 501 may be configured to control the valves to allow liquid to be filtered by filter 412 (e.g. by closing valves 160A and 160B and opening valves 160C, 160D and 160F). At spaced apart times controller 501 may interrupt this operation to perform a cleaning cycle. The cleaning cycle may comprise, for example, closing valves 160C and 160D and opening valves 160A and 160B. This causes a reduction of pressure in tank 410 and in particular at valve 160B, as described above, such that gas can be drawn though valve 160B into tank 410 where it forms bubbles that help to clean filter 412 and liquid can drain from tank 410 through valve 160A. If valve 160F is open during all or part of the cleaning cycle then backwash liquid may also be drawn into tank 410 through filter 412.

In some embodiments controller 501 controls the valves in various ways to enhance the cleaning cycle. Some examples of possible ways in which the valves may be controlled are:

Valve 160B may be opened and closed during the cleaning cycle to allow gas to enter tank 410 in spurts. The timing of opening and closing valve 160B may optionally be matched to a natural period of oscillation of the liquid in tank 410.

Valve 160B may optionally be opened and closed in combination with opening and closing valve 160F to cause a desired pattern of backwashing filter 412 and generating bubbles that scour filter 412. The pattern may, for example: alternate backwashing and bubble scouring; alternate periods of combined backwashing and bubble scouring with quiet periods; turn backwashing on and off while bubble scouring occurs; or turn bubble scouring on and off while backwashing occurs.

Valve 160B may be partially closed during all or part of the cleaning cycle so that the flow of backwash does not overly impair the development of reduced pressure within tank 410.

Valve 160F may be closed for parts of the cleaning cycle and open for other parts of the cleaning cycle. For example, valve 160F may initially be open to allow backwashing and subsequently closed to encourage greater gas delivery or vice versa.

Valve 160D may be briefly opened during the cleaning period and then shut. Opening valve 160D will allow flow through valve 160A to increase rapidly. When valve 160D is shut the kinetic energy of the liquid flowing into the drain may cause an enhanced reduction in pressure within tank 410. This enhanced reduction in pressure may be applied to yield increased backwashing and/or increased bubble generation.

combinations of two or more of the above.

Some embodiments include mechanisms for testing the integrity of filter 412 and/or otherwise monitoring the proper function of a system as described herein. For example, system 500 comprises pressure transducers 520A, 520B which respectively monitor pressure in tank 410 and downstream from filter 412. Controller 501 may monitor outputs of transducers 520A, 520B and conduct membrane integrity tests (e.g. pressure decay tests). Such integrity tests may be conducted without the need for devices like air blowers and gas pumps. For example, a partial vacuum in filter tank 410 can be generated by opening valve 160A as previously discussed and the sustained partial vacuum can be used to conduct integrity testing using techniques known in the field.

Controller 501 or other controllers described herein may be used in other systems such as any of systems 100 and 200 to control any suitable combination of valves 160 shown in FIGS. 2A to 2D, 3A to 3F and 4A to 4E.

Controller 501 or other controllers described herein may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, and the like. For example, one or more data processors in a control circuit for a device may implement methods as described (e.g. automatically controlling valves with a controller) herein by executing software instructions in a program memory accessible to the processors. It is convenient to use a commercially available PLC for controller 501.

Figure 6A:
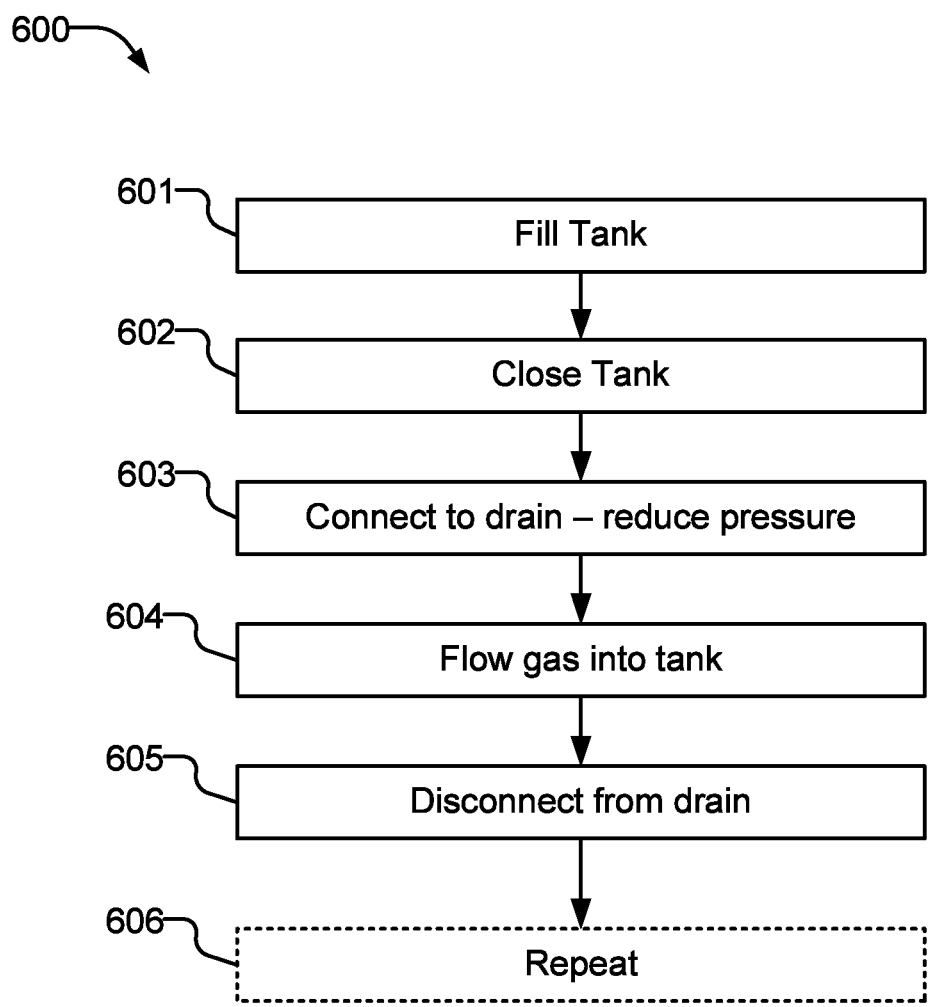
FIG. 6A is a flow chart depicting a method for introducing gas into a liquid according to an example embodiment of the invention.

FIG. 6A is a flow chart depicting a method 600 for drawing gas into a tank according to an example embodiment of the invention. In block 601 the tank is filled with liquid. In block 602 the tank is substantially closed. In block 603 pressure in the tank is reduced by placing the interior of the tank in fluid connection with a fluid outlet located below the tank. The reduced pressure is lower than a pressure of a gas supply. In block 604 gas from the gas supply is allowed to flow into the liquid and to rise through the tank. In block 605 the interior of the tank is closed off from the fluid outlet. In optional block 606 blocks 601 to 605 are repeated one or more times.

Figure 6B:
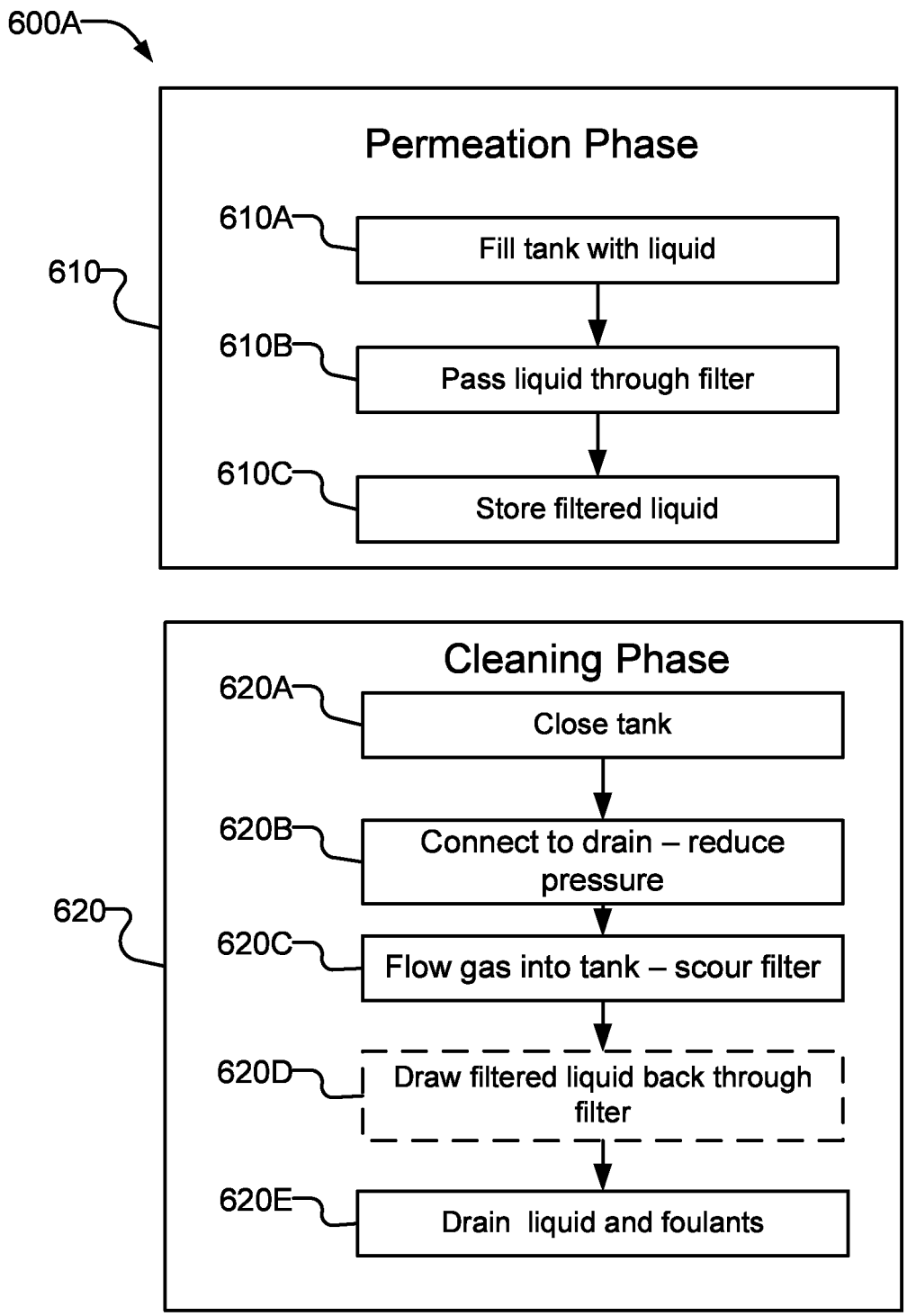
FIG. 6B is flow diagram illustrating a filtration method according to an example embodiment.

FIG. 6B is a flowchart illustrating a method 600A for filtering a liquid according to another example embodiment Method 600A comprises a permeation phase 610 followed by a cleaning phase 620.

In block 610A the tank is filled with a liquid to be filtered (e.g. water). In block 610B the liquid is passed through a filter such as a suitable membrane filter. In block 610C the filtered liquid is stored. Once the permeation phase has commenced a liquid such as water may continuously flow into the tank, be filtered, and flow to a storage location such as a permeate tank.

When the cleaning phase is commenced the tank is closed (e.g. disconnected from a supply of liquid) in block 620A. In block 620B pressure within the tank is reduced by placing the liquid in the tank in fluid communication with a liquid outlet below the tank. In block 620C, gas is drawn into the tank as a result of the reduced pressure. In some embodiments the gas is supplied at atmospheric pressure and the reduced pressure is lower than atmospheric pressure at a point where the gas is drawn into the liquid. In some embodiments the gas is air. The gas enters the tank at an elevation below the filter and rises past the filter in the form of bubbles which scour the filter of foulants. In optional block 620D filtered liquid is drawn back through the filter. Blocks 620D and 620C may be performed in parallel. In block 620E liquid containing foulants is discharged from the tank.

As will be apparent to those who have read the foregoing description, the technology described herein has many possible applications. One non-limiting example application is providing water filtration in remote areas such as work camps, small communities and the like. In such applications it is particularly advantageous that the present technology can be practiced without air blowers, air pumps or other compressors and does not require large quantities of electrical power. In some embodiments the technology described herein is used to provide a modular water treatment system. Such a water treatment system may be put into service at a remote site with very little work required at the remote site other than connecting the water treatment system to a water source and, in some cases, providing electrical power to the water treatment system.

Figure 7:
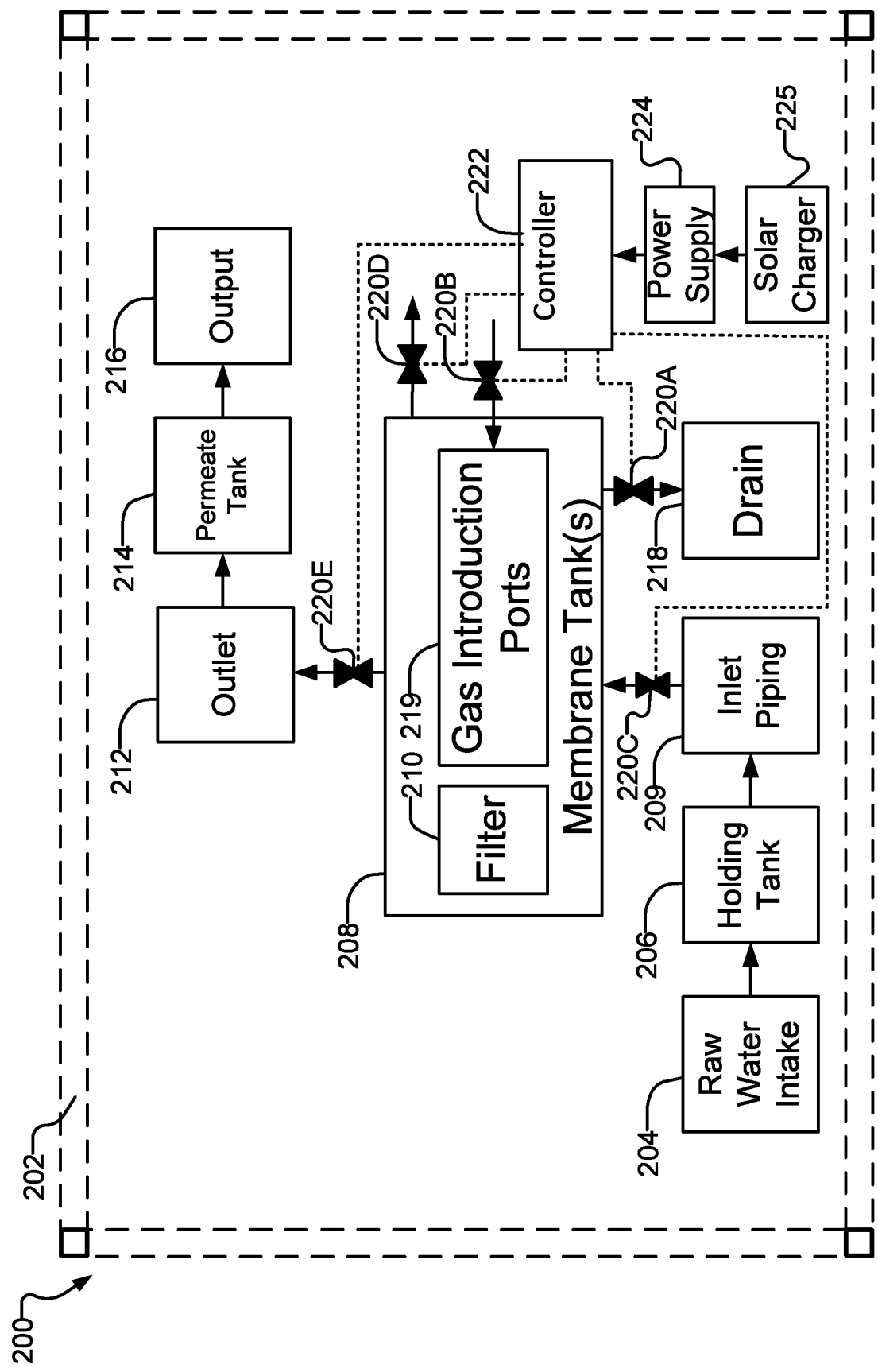
FIG. 7 is a schematic diagram of a modular water treatment system incorporating an example embodiment of the present technology.

FIG. 7 schematically illustrates an example modular water treatment system 200. System 200 is housed in a structure 202. System 200 includes a raw water intake 204 which feeds water to a raw water holding tank 206. Water from holding tank 206 feeds one or more membrane tanks 208 by way of inlet piping 209. Each membrane tank 208 comprises a membrane filter 210. An outlet 212 carries permeate (water that has passed through membrane filter 210) to a permeate tank 214. Permeate tank 214 may be connected to supply water to an output 216.

Each membrane tank 208 is connectable to a drain 218. Each membrane tank 208 includes one or more gas introduction ports 219. Valving is provided to control the operation of membrane tank 208. The illustrated embodiment provides:

- a valve 220A which allows membrane tank 208 to be selectively placed in fluid communication with or cut off from being in fluid communication with drain 218;
- a valve 220B which allows one or more of ports 219 to be selectively placed in fluid communication with or cut off from being in fluid communication with a source of air;
- a valve 220C which allows membrane tank 208 to be selectively placed in fluid communication with or cut off from being in fluid communication with holding tank 206 through inlet piping 209;
- a valve 220D which allows a top of membrane tank 208 to be selectively vented to atmosphere;
- a valve 220E which allows membrane filter 210 to be selectively placed in fluid communication with permeate tank 214 through outlet 212;
- (collectively or generally referred to as valves 220).

Valves 220 may be manually operated. However in the illustrated example embodiment, valves 220 are controlled by a controller 222. Valves 200 may, for example, be electrically operated. Controller 222 may, for example, operate in a way that is substantially similar to the way controller 501 (see FIG. 5) described above operates. Controller 222 may, for example comprise a computer or programmable logic controller (PLC) programmed to open and close valves 220 in sequences which cause air to enter at ports 219 to provide bubbles in membrane tank 208. In the alternative, controller 222 may be hard wired to control the operation of valves 200 as described herein. For example, controller 222 may comprise a timer and electrically controlled switches controlled by the timer to switch between operating to filter water and operating to clean the filter as described herein.

In the illustrated system 200, controller 222 is powered by a battery power supply 224 charged by a solar charger 225. System 200 and controller 222 may be powered by other power supplies and/or sources of energy (e.g. wind, hydro, electric, etc.)

Water treatment system 200 may optionally include one or more other systems such as:

- systems for introducing chlorine, ozone or another disinfectant into water being processed,
- systems for irradiating water being processed with ultraviolet light or other radiation etc.,
- delivery pumps for delivering treated water
- supply pumps for supplying raw water,
- monitoring systems configured to track usage of system 220 and/or monitor the condition and integrity of system 200 and its components,
- screens for removing large particulate material from the raw water prior to filtration.

The dimensions of components described herein may vary. In some embodiments the liquid in a tank into which a gas is introduced as described herein has a height in the range of 0.8 m to 3 m above a liquid drain valve. The invention may be practiced with tanks having dimensions outside of this range also.

A wide range of variations are possible within the scope of the present invention. These variations may be applied to all of the embodiments described above, as suited, and include, without limitation:

- Pumped flow may be used instead of or in addition to gravity for the purpose of reducing pressure within a tank to allow a gas to be drawn into the tank. For example, a pump may be connected inline with drain piping between gas supply (e.g. gas supply 140, gas source 450, etc.) and a fluid outlet (e.g. liquid outlet 150) in any of the above embodiments. Pumped flow may be used as an alternative to gravity flow to drain the tank (e.g. tank 101, filter tank 410, etc.).
- It is not mandatory that gas be supplied at atmospheric pressure. In some embodiments gas is supplied at a pressure that is higher or lower than atmospheric pressure. For example, a pump, blower, compressor or the like may be included in the gas supply. The pump, blower, compressor or the like may have a capacity that is lower than would otherwise be required to deliver a given volume of bubbles into the tank as a result of the reduced pressure that is created within a tank as described above. In some embodiments the gas is pressurized to a gas supply pressure that is greater than atmospheric pressure using pressurized liquid. For example gas may be pressurized in a gas supply tank having a liquid inlet connected to receive a liquid supplied at a pressure that is greater than atmospheric pressure and a drain. The liquid may be the same liquid that is being treated (e.g. water). The gas may be pressurized by providing gas in the gas supply tank, closing a valve on the drain of the gas supply tank and opening a valve to allow the liquid to enter the gas supply tank. The gas will become compressed in an upper portion of the gas supply tank. After the compressed gas is injected in to the tank, the gas supply tank may be drained of liquid by closing the liquid supply valve and opening the valve on the drain of the gas supply tank.
- It is not mandatory that the gas be air. Other gases may be used. For example, the gas may be any suitable gas, such as nitrogen, carbon dioxide, or methane, as well as gases with modified properties such as high temperature gases and/or high moisture content gases;
- Where bubbling cycles are automatically controlled, bubbling cycles may be triggered based on time, flow of liquid through a tank or filter (e.g. as measured by a flowmeter) a measure of pressure drop across a filter, combinations of these or the like.
- Suitable diffusers may be provided in any embodiment to direct bubbles to desired areas within a tank.
- Plural gas inlets may be provided and controlled to produce bubbles at different locations within a tank at the same or different times.
- Orientations and/or geometry of tanks and other components of systems as described herein may be selected to achieve desired location, timing and/or flow rates of bubbles into a tank.
- A fluid inlet for refilling a tank with liquid may be provided by a port located at any location in a tank.
- It is not mandatory that a tank be completely sealed apart from its connection(s) to the fluid outlet and gas supply while it is drained. If some air, backwash liquid or other fluid is able to enter the tank while it is being drained the objective of introducing gas into the tank can still be achieved as long as a low enough reduced pressure is present at the location where gas enters the liquid so that the gas can enter the liquid and rise through the tank.

The volume of gas that may be drawn into a tank to clean a filter or other devices may be increased by designing the system to contain an increased amount of liquid above the filter or other device.

A tank may be repeatedly, simultaneously and/or periodically filled and drained.

In some embodiments a filter and a tank containing the filter are provided by a commercially available membrane filtration module. In some embodiments the filter has the form of plural closed-ended tubes of membrane material selected to provide desired filtration characteristics.

Combinations of any two or more of the above.

INTERPRETATION OF TERMS

Unless the context clearly requires otherwise, throughout the description and the claims:
  "tank" and variants thereof mean any suitable vessel or container or arrangement of interconnected vessels or containers in which fluids may be contained;
  "gas" (being introduced to the system) may refer to any suitable gas, such as air, nitrogen, carbon dioxide, or methane, as well as gases with modified properties such as high temperature gases and/or high moisture content gases;
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

While steps or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

While steps or blocks are at times shown as being performed sequentially, they may instead be performed simultaneously or in different sequences. While steps or blocks are described as being performed continuously such steps or blocks may be performed intermittently and/or operation of such steps or blocks may be interrupted on occasion.

Where a component (e.g. membrane module, raw water tank, filtered water tank, gas source, drain, controller, valve, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:
1. A method for introducing gas into a liquid, the method comprising:

reducing a pressure of the liquid within a closed tank by placing the liquid within the tank in fluid communication with a fluid outlet such that, at a gas supply location above the fluid outlet, the pressure of the liquid is reduced from a pressure that is greater or equal to a gas supply pressure to a reduced pressure that is lower than the gas supply pressure;

supplying a gas at the gas supply pressure at the gas supply location, allowing the gas to enter the liquid as a result of the difference between the reduced pressure of the liquid and the gas supply pressure; and allowing the gas to rise from the gas supply location through the tank and allowing the liquid displaced by the gas to exit by way of the fluid outlet.

2. The method according to claim 1 wherein the gas supply pressure is ambient atmospheric pressure.

3. The method according to claim 1 wherein the gas is ambient air.

4. The method according to claim 1 wherein supplying the gas at the supply location comprises opening a gas supply valve.

5. The method according to claim 4 wherein placing the liquid within the tank in fluid communication with the fluid outlet comprises opening a drain valve that is below the gas supply location.

6. The method according to claim 5 comprising opening the gas supply valve after the drain valve has been opened.

7. The method according to claim 1 wherein supplying the gas at the supply location comprises draining any of the liquid out of an open gas supply conduit that is open to the atmosphere at a location above the gas supply location.

8. The method according to claim 1 wherein the fluid outlet connects to the tank by way of a drain line and the gas supply location is in the drain line.

9. The method according to claim 8 wherein the gas enters the tank by way of the drain line.

10. The method according to claim 1 wherein the gas supply location comprises a port located at or below a bottom of the tank.

11. The method according to claim 1 wherein a filter is located in the tank and the method comprises allowing the gas to scour the filter as the gas rises through the tank.

12. The method according to claim 11 wherein the reduced pressure draws liquid from a permeate tank located above the closed tank back through a permeate line in fluid communication with the filter to backwash the filter.

13. The method according to claim 11 comprising allowing foulants scoured from the filter to drain by way of the fluid outlet.

14. The method according to claim 11 comprising subsequently refilling the tank with the liquid through a liquid inlet and applying a pressure differential to cause the liquid to pass through the filter wherein refilling the tank comprises venting the gas from a gas vent valve of the tank.

15. The method according to claim 1 wherein the liquid is water.

16. Apparatus for introducing gas into a liquid, the apparatus comprising:

a closed tank having a drain port located at or near a bottom of the tank;

a downwardly extending conduit connecting the drain port to a fluid outlet located below the tank;

a drain valve connected between the drain port of the tank and the fluid outlet, the drain valve operative to place an interior of the tank in fluid communication with the fluid outlet;

a gas source in fluid communication with the interior of the tank, the gas source arranged to supply a gas at a gas supply location at an elevation above the fluid outlet and below a top of the closed tank;

and a controller connected to control the drain valve, the controller configured to periodically open the drain valve to reduce a pressure within the liquid at the gas supply location from a pressure that is above a pressure of the gas to a reduced pressure that is below a pressure of the gas to thereby allow the gas to enter the tank as a result of the difference between the reduced pressure within the tank and the pressure of the gas.

17. The apparatus according to claim 16 wherein the gas source is operative to supply the gas at atmospheric pressure and the gas source comprises a source of air.

18. The apparatus according to claim 17 wherein the gas supply comprises an open gas supply conduit that is open to the atmosphere at a location above the gas supply location.

19. The apparatus according to claim 16 comprising a filter in the tank, the filter located in a path taken by the gas in rising through the tank such that the rising gas scours the filter.

20. A membrane filtration system comprising:

a tank comprising at least one fluid port located at or near a bottom of the tank;

a membrane filter in the tank, the membrane filter connected to a permeate line that exits the tank;

a drain line in fluid connection with an interior of the tank by way of the at least one fluid port;

a drain valve operative to open or close the drain line;

a liquid supply valve in fluid communication with the interior of the tank and a liquid supply connected to supply liquid to the interior of the tank by way of the liquid supply valve and the at least one fluid port;

a gas source connected to supply gas at a gas supply location in fluid communication with the interior of the tank, the gas supply location at an elevation below the filter and above an outlet of the drain line; and a controller connected to control the drain valve and the liquid supply valve and configured to close the liquid supply valve and open the drain valve to thereby reduce a pressure within the liquid at the gas supply location from a pressure above a pressure of the gas to a reduced pressure below the pressure of the gas to allow the gas to enter the liquid as a result of the difference between the reduced pressure within the liquid and the pressure of the gas and to bubble upwardly past the filter.

* * * * *